(12) United States Patent
Avey et al.

(10) Patent No.: US 10,387,977 B2
(45) Date of Patent: Aug. 20, 2019

(54) ENVIRONMENTAL MANAGEMENT ZONE MODELING AND ANALYSIS

(71) Applicant: Pioneer Hi-Bred International, Inc., Johnston, IA (US)

(72) Inventors: Donald P. Avey, Ankeny, IA (US); Robert Alan Gunzenhauser, Humeston, IA (US); Joe Hanson, Waukee, IA (US); Bruce J. Walker, Concord, MA (US); Sean Warnick, Provo, UT (US); Jun Wei, Waukee, IA (US); Chris Winkler, Urbandale, IA (US)

(73) Assignee: PIONEER HI-BRED INTERNATIONAL, INC. IA (US)

( * ) Notice: Subject to any disclaimer, the term of this patent is extended or adjusted under 35 U.S.C. 154(b) by 361 days.

(21) Appl. No.: 14/630,991

(22) Filed: Feb. 25, 2015

(65) Prior Publication Data

US 2015/0242970 A1    Aug. 27, 2015

Related U.S. Application Data

(60) Provisional application No. 61/944,436, filed on Feb. 25, 2014, provisional application No. 62/019,175, (Continued)

(51) Int. Cl.
*G06Q 10/06* (2012.01)
*G06Q 50/16* (2012.01)

(52) U.S. Cl.
CPC ......... *G06Q 50/163* (2013.01); *G06Q 10/067* (2013.01)

(58) Field of Classification Search
None
See application file for complete search history.

(56) References Cited

U.S. PATENT DOCUMENTS

| 5,668,719 A | 9/1997 | Bobrov et al. |
| 5,741,983 A | 4/1998 | Skotnikov et al. |

(Continued)

FOREIGN PATENT DOCUMENTS

| CA | 2663917 | 10/2010 |
| CN | 101996349 A | 3/2011 |

(Continued)

OTHER PUBLICATIONS

Paz et al., "Model-based technique to determine variable rate nitrogen for corn", May 1999, Agricultural Systems, vol. 61, pp. 69-75.*

(Continued)

*Primary Examiner* — Whitney Moore

(57) ABSTRACT

Methods and systems for crop management are disclosed. An example method can comprise receiving first information associated with an environmental management zone. The first information can relate to one or more of a land characteristic and a management practice. The first information can comprise a soil type of the environmental management zone. An example method can comprise, receiving historical weather data relating to the environmental management zone. An example method can comprise receiving real-time weather data relating to the environmental management zone. An example method can comprise executing a growth model to predict a nitrogen range for the environmental management zone based on one or more of the first information, the historical weather data, and the real-time weather data. The nitrogen range can comprise probabilities for one or more of a current time period and a future time period in the growing season.

12 Claims, 23 Drawing Sheets

Related U.S. Application Data filed on Jun. 30, 2014, provisional application No. 62/019,159, filed on Jun. 30, 2014, provisional application No. 62/039,283, filed on Aug. 19, 2014, provisional application No. 62/039,283, filed on Aug. 19, 2014, provisional application No. 62/039,286, filed on Aug. 19, 2014.

(56) References Cited

U.S. PATENT DOCUMENTS

| | | | |
|---|---|---|---|
| 5,771,169 A | 6/1998 | Wendte | |
| 5,850,620 A | 12/1998 | Skotnikov et al. | |
| 6,505,146 B1 | 1/2003 | Blackmer | |
| 6,601,341 B2* | 8/2003 | Raun | A01C 21/007 47/48.5 |
| 7,343,867 B2* | 3/2008 | Fraisse | A01B 49/06 111/118 |
| 8,032,389 B2 | 10/2011 | Avey et al. | |
| 8,046,280 B2 | 10/2011 | Avey et al. | |
| 8,249,926 B2 | 8/2012 | Avey et al. | |
| 8,290,795 B2 | 10/2012 | Avey et al. | |
| 8,417,602 B2 | 4/2013 | Avey et al. | |
| 2001/0016788 A1* | 8/2001 | Hauwiller | A01B 79/005 700/283 |
| 2002/0022929 A1 | 2/2002 | Ell | |
| 2003/0019151 A1* | 1/2003 | Raun | A01C 21/007 47/58.1 SC |
| 2003/0019152 A1 | 1/2003 | Raun et al. | |
| 2003/0019408 A1 | 1/2003 | Fraisse et al. | |
| 2004/0231239 A1 | 11/2004 | Raun et al. | |
| 2004/0237394 A1 | 12/2004 | Mayfield et al. | |
| 2005/0165552 A1 | 7/2005 | Fraisse et al. | |
| 2006/0282228 A1 | 12/2006 | Avey et al. | |
| 2006/0282296 A1 | 12/2006 | Avey et al. | |
| 2006/0282299 A1 | 12/2006 | Avey et al. | |
| 2006/0293913 A1 | 12/2006 | Iwig et al. | |
| 2007/0186830 A1 | 8/2007 | Fraisse et al. | |
| 2008/0304711 A1* | 12/2008 | Scharf | A01C 21/007 382/110 |
| 2009/0089171 A1 | 4/2009 | Avey et al. | |
| 2009/0089224 A1 | 4/2009 | Avey et al. | |
| 2009/0112637 A1 | 4/2009 | Avey et al. | |
| 2010/0024296 A1 | 2/2010 | Lazarus et al. | |
| 2010/0306012 A1* | 12/2010 | Zyskowski | G06Q 10/0637 705/7.36 |
| 2011/0113030 A1 | 5/2011 | Hunter et al. | |
| 2011/0166788 A1 | 7/2011 | Griffin | |
| 2011/0286636 A1* | 11/2011 | Purcell | G01N 21/25 382/110 |
| 2012/0101634 A1 | 4/2012 | Lindores | |
| 2012/0101784 A1 | 4/2012 | Lindores et al. | |
| 2012/0101796 A1 | 4/2012 | Lindores | |
| 2012/0101861 A1 | 4/2012 | Lindores | |
| 2012/0101934 A1 | 4/2012 | Lindores et al. | |
| 2012/0109614 A1 | 5/2012 | Lindores | |
| 2012/0237083 A1 | 9/2012 | Lange et al. | |
| 2012/0239299 A1 | 9/2012 | Griffin | |
| 2013/0014046 A1* | 1/2013 | Watts | G01W 1/00 715/772 |
| 2013/0044919 A1* | 2/2013 | Purcell | G01N 21/25 382/110 |
| 2013/0198057 A1 | 8/2013 | Avey et al. | |
| 2013/0338931 A1 | 12/2013 | Maidl | |
| 2014/0012732 A1 | 1/2014 | Lindores | |
| 2014/0039967 A1* | 2/2014 | Scharf | G06K 9/00657 705/7.25 |
| 2014/0067745 A1 | 3/2014 | Avey et al. | |
| 2014/0273253 A1* | 9/2014 | Roberts | G01N 33/6809 436/90 |
| 2015/0254800 A1* | 9/2015 | Johnson | C05C 11/00 382/141 |
| 2016/0042232 A1* | 2/2016 | Scharf | G06Q 10/06315 382/110 |
| 2016/0180473 A1* | 6/2016 | Groeneveld | A01G 22/00 705/7.25 |
| 2017/0039449 A1* | 2/2017 | Scharf | A01C 21/007 |

FOREIGN PATENT DOCUMENTS

| | | |
|---|---|---|
| CN | 102539392 A | 7/2012 |
| CN | 103024939 A | 4/2013 |
| CN | 103081624 A | 5/2013 |
| DE | 102004055217 A1 | 5/2006 |
| JP | 3019623 A2 | 1/1991 |

OTHER PUBLICATIONS

Thorp et al., "Methodology to link prodution and environmental riks of precision nitrogen management strategies in corn", Agricultural Systems, vol. 89, Jan. 2006, pp. 272-298.*

T.A. Doerge, "Variable-Rate Nitrogen Management for Corn Production—Success Proves Elusive", Site-Specific Management Guidelines, SSMG-36, Dec. 2002, 4 pages.*

Wu et al., "Establishing a Regional Nitrogen Management Approach to Mitigate Greenhouse Gas Emission Intensity from Intensive Smallholder Maize Production", PLoS ONE 9(5): e98481. doi:10.1371/journal.pone.0098481, May 2014, 11 pages.*

PCT International Search Report and Written Opinion dated Mar. 27, 2014, in International Patent Application No. PCT/US13/57320.

Cornell University [online] [retrieved May 15, 2014]. Retrieved from the Internet: <http://adapt-n. cals.cornell.edu/webinars/index.html—Cloud Computing Technology for Precision Nitrogen Management in Corn/NConcerns.pdf>. (Apr. 3, 2014) 41 pages.

Cornell University [online] [retrieved May 15, 2014]. Retrieved from the Internet: <http://adapt-n.cals.cornell.edu/webinars/index.html—Cloud Computing Technology for Precision Nitrogen Management in Corn/Trial Results.pdf>. (Apr. 3, 2014) 57 pages.

Cornell University [online] [retrieved May 15, 2014]. Retrieved from the Internet: <http://adapt-n. cals.cornell.edu/webinars/index.html—Cloud Computing Technology for Precision Nitrogen Management in Corn/Whats New.pdf>. (Apr. 3, 2014) 14 pages.

Cornell University [online] [retrieved May 15, 2014]. Retrieved from the Internet: <http://adapt-n.cals.cornell.edu/webinars/index.html—Cloud Computing Technology for Precision Nitrogen Management in Corn/Inner Workings.pdf>. (Apr. 3, 2014) 43 pages.

Cornell University [online] [retrieved May 15, 2014]. Retrieved from the Internet: <http://adapt-n.cals.cornell.edu/webinars/index.html—Cloud Computing Technology for Precision Nitrogen Management in Corn/Effective Use.pdf>. (Apr. 3, 2014) 22 pages.

Cornell University [online] [retrieved May 15, 2014]. Retrieved from the Internet: <http://adapt-n.cals.cornell.edu/webinars/index.html—Cloud Computing Technology for Precision Nitrogen Management in Corn/Complementary Technologies.pdf>. (Apr. 3, 2014) 22 pages.

Cornell University [online] [retrieved May 15, 2014]. Retrieved from the Internet: <http://adapt-n. cals.cornell.edu/webinars/index.html—Precision Nitrogen Management in Corn Using the Adapt-N Tool/Overview Dynamics.pdf>. (Mar. 21, 2013) 15 pages.

Cornell University [online] [retrieved May 15, 2014]. Retrieved from the Internet: <http://adapt-n. cals.cornell.edu/webinars/index.html—Precision Nitrogen Management in Corn Using the Adapt-N Tool/Adapt-N Interface Overview. pdf>. (Mar. 21, 2013) 23 pages.

Cornell University [online] [retrieved May 15, 2014]. Retrieved from the Internet: <http://adapt-n. cals.cornell.edu/webinars/index.html—Precision Nitrogen Management in Corn Using the Adapt-N Tool/Adapt-N On-Farm Trial Results. pdf>. (Mar. 21, 2013) 24 pages.

Cornell University [online] [retrieved May 15, 2014]. Retrieved from the Internet: <http://adapt-n.cals.cornell.edu/webinars/index.html—Precision Nitrogen Management in Corn Using the Adapt-N Tool/Adapt-N Effective Use.pdf>. (Mar. 21, 2013) 9 pages.

(56) References Cited

OTHER PUBLICATIONS

Cornell University [online] [retrieved May 15, 2014]. Retrieved from the Internet: <http://adapt-n.cals.cornell.edu/webinars/index. html—Precision Nitrogen Management in Corn Using the Adapt-N Tool/Adapt-N Inner Workings.pdf>. (Mar. 21, 2013) 20 pages.
Cornell University [online] [retrieved May 15, 2014]. Retrieved from the Internet: <http://adapt-n. cals.cornell.edu/webinars/index. html—Precision Nitrogen Management in Corn Using the Adapt-N Tool/Adapt-N Exercise.pdf>. (Mar. 21, 2013) 6 pages.
Russ, et al.; "Machine Learning Methods for Spatial Clustering on Precision Agriculture Data"; Scandinavian Conference on Artificial Intelligence/Frontiers in Artificial Intelligence and Applications (2011) 40-49.
Chotangui, et al.; "Performance Test of the Soil Nitrogen Balance Estimation System Using Lysimeter Experiments Conducted in Andosol-Based Cropping Systems"; Environ. Control Biol., (2013) 51(3):121-129.
Ma, et al.; "On-farm comparison of variable rates of nitrogen with uniform application to maize on canopy reflectance, soil nitrate, and grain yield"; J. Plant Nutr. Soil Sci. (2014) 177:216-226.
Thole, et al.; "Strategy of statistical model selection for precision farming on-farm experiments"; Precision Agric. (2013) 14:434-449.
Tremblay, et al.; "Development and validation of fuzzy logic inference to determine optimum rates of N for corn on the basis of field and crop features"; Precision Agric. (2010) 11(6):621-635.
Cao, et al.; "Quantifying spatial variability of indigenous nitrogen supply for precision nitrogen management in small scale farming"; Precision Agric. (2012) 13(1):45-61.
Meyer-Aurich, et al.; "Spatial econometric analysis of a field-scale site-specific nitrogen fertilizer experiment on wheat (Triticum aestuvum L.) yield and quality"; Computers and Electronics in Agriculture (2010) 74(1):73-79.
Miao, et al.; "Potential Impact of Precision Nitrogen Management on Corn Yield, Protein Content, and Test Weight"; Soil Science Society of America Journal (2007) 71(5)1490-1499.
Philippa, et al.; "A comparison of he performance of VIS/NIR sensors used to inform nitrogen fertilization strategies (Conference Paper)" American Society of Agricultural and Biological Engineers Annual International Meeting (2012) 6:4513-4525.

* cited by examiner

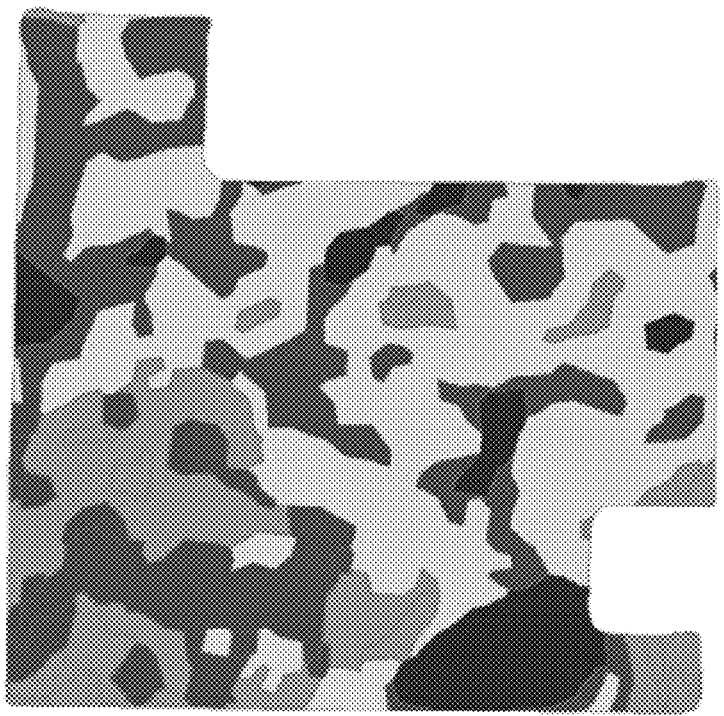

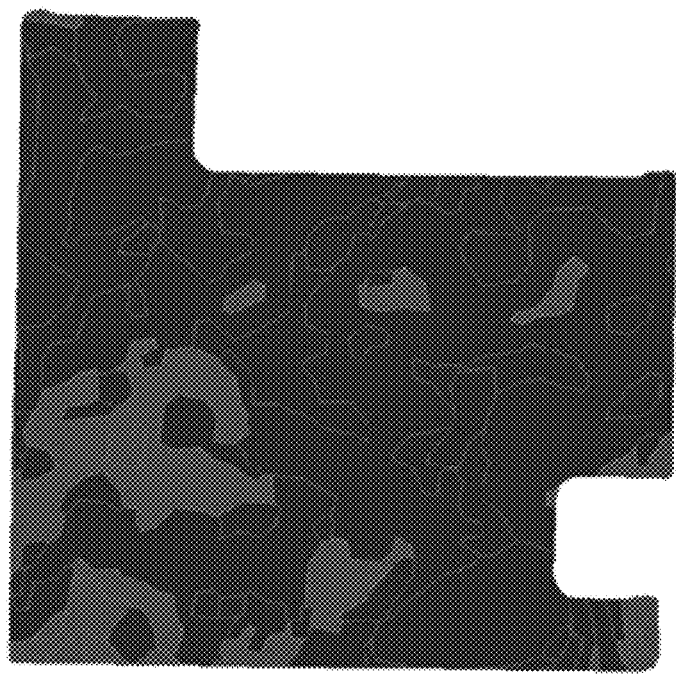

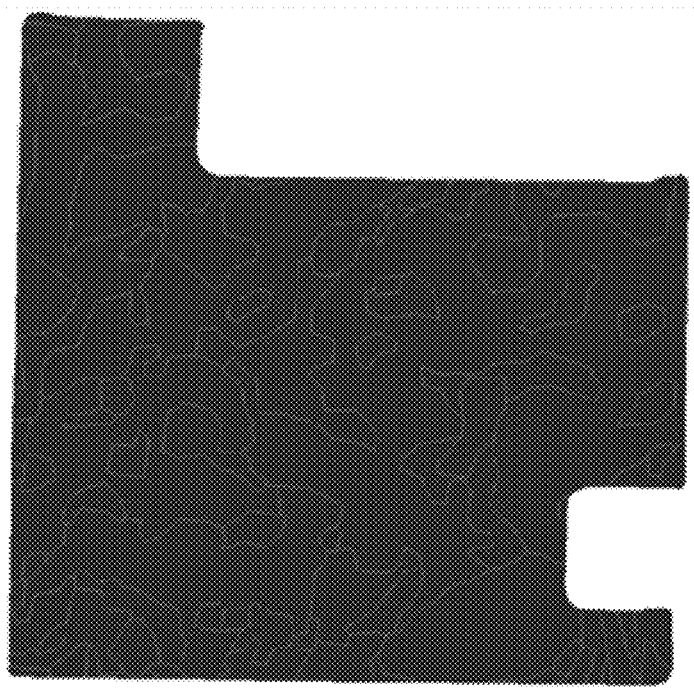

Risk Estimates

1200

Legend:
- ▨ 75% to 100%
- ▩ 50% to 74%
- ■ 0% to 49%

| Field | | Primary Plan | | | Alternate Plan | | |
|---|---|---|---|---|---|---|---|
| Farm-Field | ACRES | Chance of Success at V6 | Acres at Risk | Est. Expense Loss/Ac | Chance of Success at V6 | Acres at Risk | Est. Expense Loss/Ac |
| Farm 1 - River... | 46.66 | ■ 0.0% | ■ 46.86 | $593.99 | ■ 36.0% | ■ 29.99 | $207.48 |
| Farm 1 - West | 50.12 | ■ 12.0% | ■ 52.91 | $305.67 | ■ 0.0% | ■ 60.12 | $580.25 |
| Farm 1 - ZAS | 6.48 | ▨ 90.0% | ▨ 0.65 | $197.66 | -- | -- | -- |
| Farm 2 - 1006 | 10.84 | ▩ 60.0% | ▩ 4.34 | $188.67 | -- | -- | -- |
| Farm 2 - East Field | 10.83 | ▩ 70.0% | ▩ 3.25 | $89.74 | -- | -- | -- |
| Farm 3 - 24321 | 74.29 | ■ 6.0% | ■ 69.83 | $376.90 | ■ 6.0% | ■ 72.80 | $363.64 |
| Farm 3 - NORTH | 72.21 | ■ 48.0% | ■ 37.55 | $221.70 | ▩ 52.0% | ▩ 34.66 | $140.81 |
| Farm 4 - 1-2 | 40.77 | ■ 0.0% | ■ 40.77 | $515.00 | -- | -- | -- |
| Farm 4 - Defoil E... | 17.96 | ■ 0.0% | ■ 17.96 | $265.23 | -- | -- | -- |
| Farm 4 - East Bot... | 90.69 | ■ 30.0% | ■ 63.62 | $318.82 | ■ 2.0% | ■ 89.07 | $432.11 |
| Farm 4 - east fie... | 55.03 | ■ 0.0% | ■ 55.03 | $666.16 | -- | -- | -- |
| Farm 4 - lund nor... | 16.48 | ■ 48.0% | ■ 8.57 | $159.82 | -- | -- | -- |
| Farm 4 - po453 | 51.42 | ■ 24.0% | ■ 39.08 | $241.86 | -- | -- | -- |
| Total | 554.18 | -- | 440.42 | -- | -- | 286.64 | -- |
| Weighted Avg. | -- | 21.0% | -- | $362.67 | 17.0% | -- | $351.55 |

FIG. 12

| Company 1 |
|---|
| 1600 |

Planting Settings

Planting Date: ◁ MAY ▼ ◁ 8 ▼ ▷

Seeding Rate: 29000    *Please enter a number between 10000 and 50000*

CRM: 113    *Please enter a number between 72 and 135*

Nitrogen Settings

N Simulation Depth: ● 12 inch    ○ 24 inch

N Production Cost per Ton: *Please enter a whole dollar amount*   ← 1602

| AMS | AN | APP | DAP | MAP | NH3 | UAN | UREA |
|---|---|---|---|---|---|---|---|
| 251 | 281 | 515 | 290 | 450 | 475 | 494 | 295 |

N Application Cost per Acre: *Please enter a whole dollar amount*   ← 1604

| | AMS | AN | APP | DAP | MAP | NH3 | UAN | UREA |
|---|---|---|---|---|---|---|---|---|
| Broadcast, Incorporated | 21 | 5 | 11 | 3 | 4 | 9 | 5 | 7 |
| Broadcast, not Incorporated | 4 | 6 | 7 | 9 | 1 | 7 | 9 | 8 |
| Injected | 12 | 11 | 10 | 3 | 8 | 4 | 8 | 10 |

FIG. 16

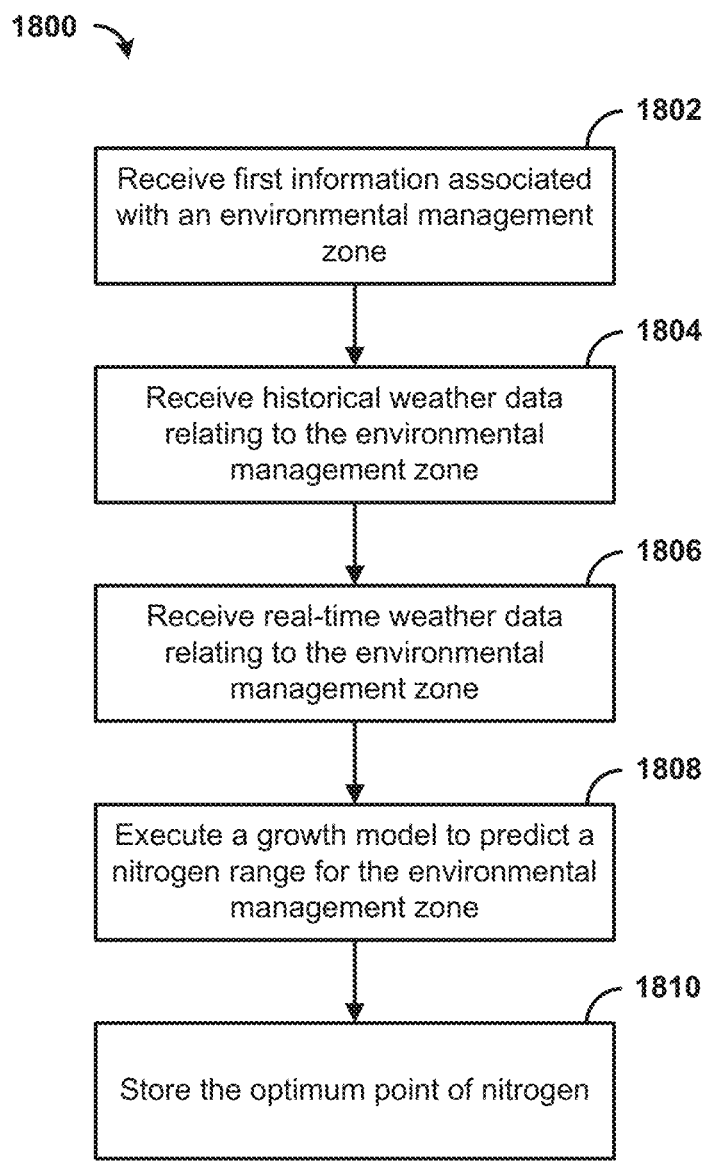

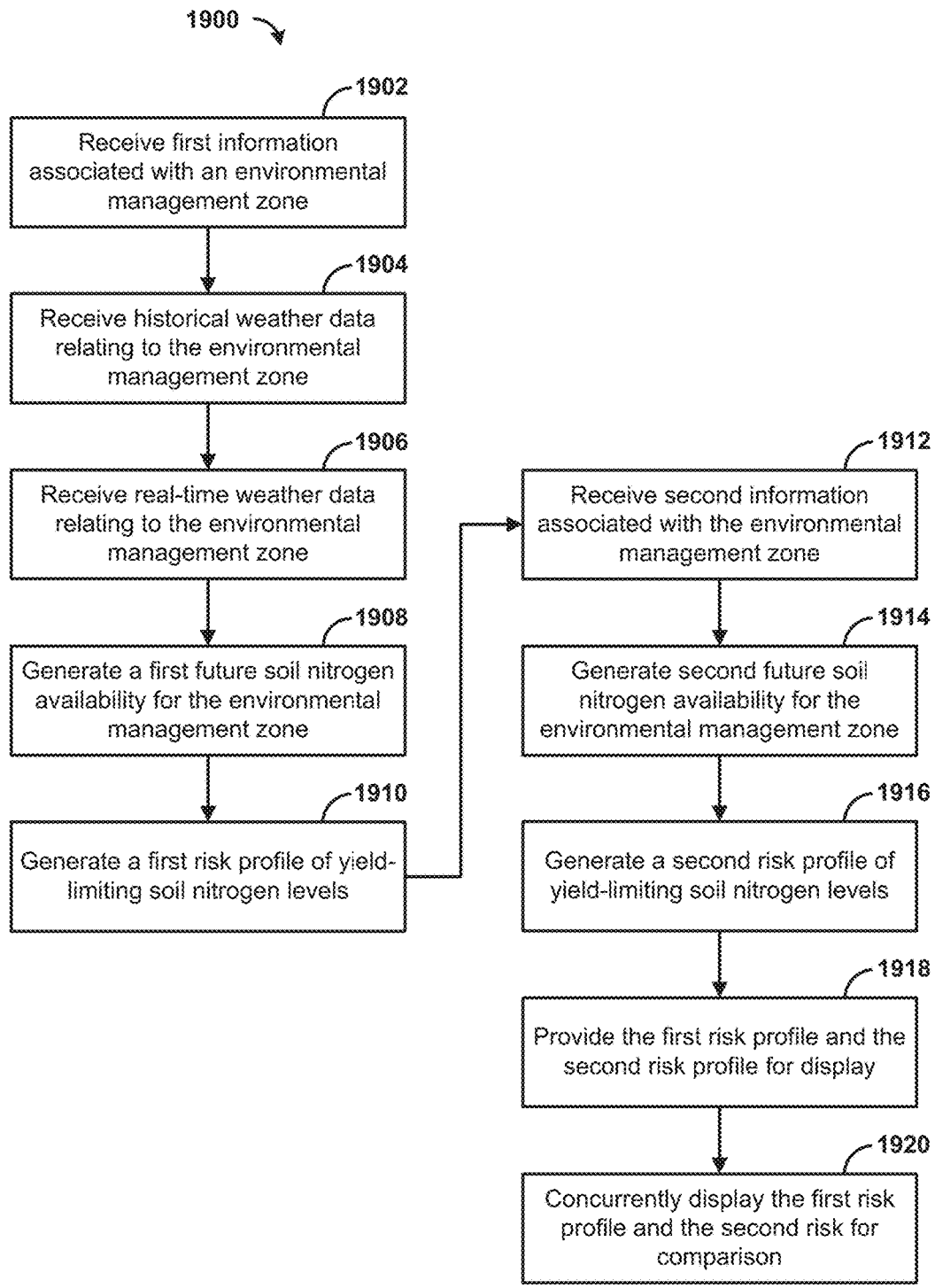

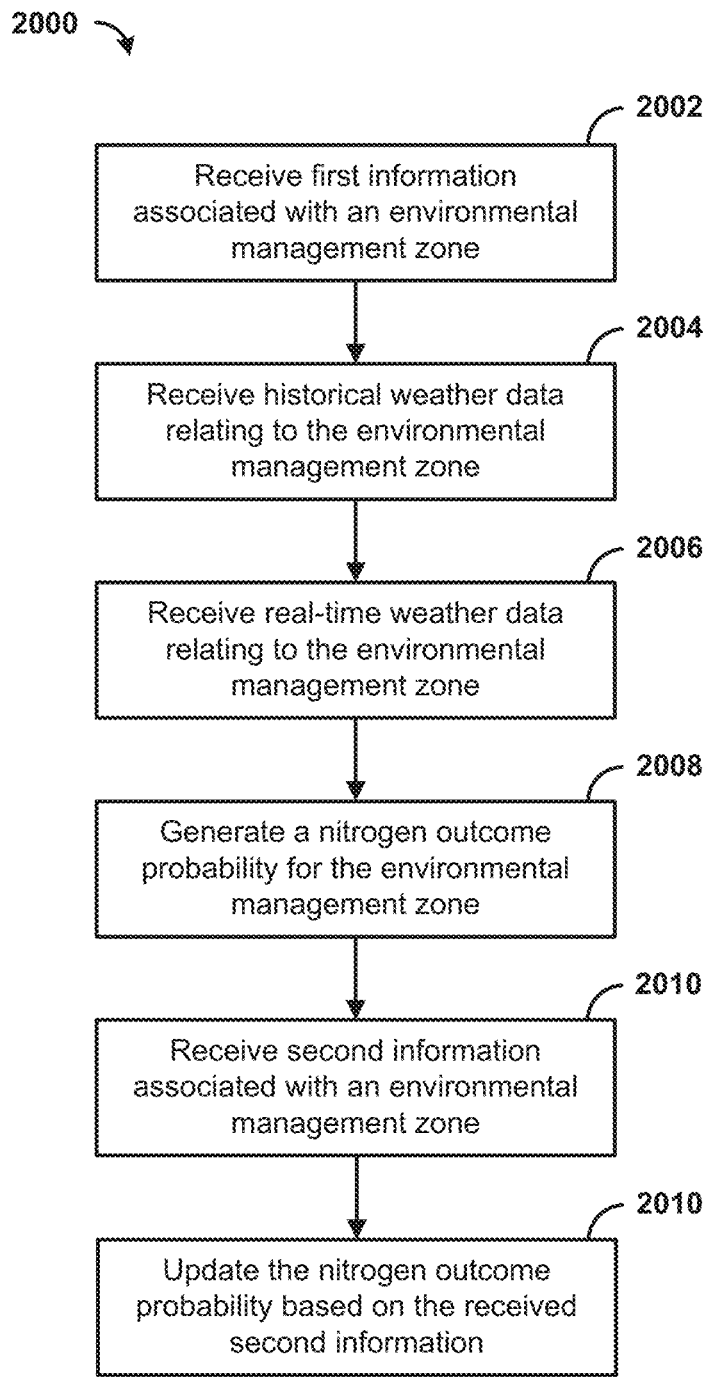

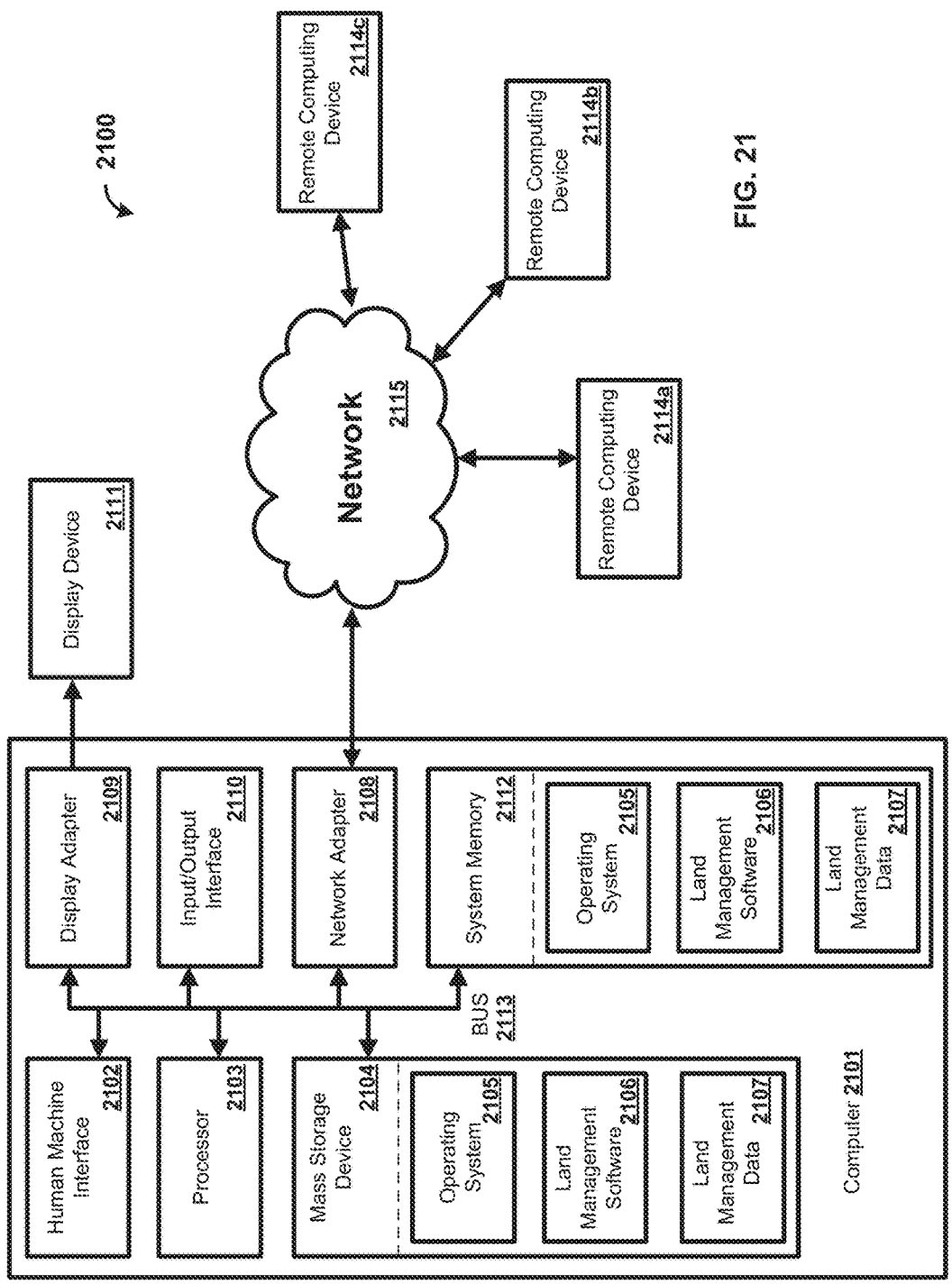

ENVIRONMENTAL MANAGEMENT ZONE MODELING AND ANALYSIS

CROSS REFERENCE TO RELATED PATENT APPLICATION

This application claims priority to U.S. Provisional Application No. 61/944,436 filed Feb. 25, 2014, U.S. Provisional Application No. 62/019,175 filed Jun. 30, 2014, U.S. Provisional Application No. 62/019,159 filed Jun. 30, 2014, U.S. Provisional Application No. 62/039,283 filed Aug. 19, 2014, and U.S. Provisional Application No. 62/039,286 filed Aug. 19, 2014, herein incorporated by reference in their entirety.

SUMMARY

It is to be understood that both the following general description and the following detailed description are exemplary and explanatory only and are not restrictive, as claimed. Provided are methods and systems for land management. An example method can comprise receiving, by a computing device, first information associated with an environmental management zone. The first information can relate to one or more of a land characteristic and a management practice. The first information can comprise a soil type of the environmental management zone. An example method can comprise receiving, by the computing device, historical weather data relating to the environmental management zone. An example method can also comprise receiving, by the computing device, real-time weather data relating to the environmental management zone. An example method can further comprise executing a growth model to predict a nitrogen range for the environmental management zone based on one or more of the first information, the historical weather data, and the real-time weather data. The nitrogen range can comprise probabilities for one or more of a current time period and a future time period in the growing season.

In another aspect, an example method can comprise receiving, by a computing device, first information associated with an environmental management zone, wherein the first information relates to one or more of a land characteristic and a first management plan. The first information can comprise a soil type of the environmental management zone. An example method can comprise receiving, by the computing device, historical weather data relating to the environmental management zone. An example method can comprise receiving, by the computing device, real-time weather data relating to the environmental management zone. An example method can also comprise generating a first future soil nitrogen availability for the environmental management zone based on one or more of the first information, the historical weather data, and the real-time weather data. An example method can further comprise generating a first risk profile of yield-limiting soil nitrogen levels based upon at least the predicted first future soil nitrogen availability.

In yet another aspect, an example method can comprise receiving, by a computing device, first information associated with an environmental management zone. The first information can relate to one or more of a land characteristic and a management practice. The first information can comprise a soil type of the environmental management zone. An example method can comprise receiving, by the computing device, historical weather data relating to the environmental management zone. An example method can comprise receiving, by the computing device, real-time weather data relating to the environmental management zone. An example method can comprise generating a nitrogen outcome probability for the environmental management zone based on one or more of the first information, the historical weather data, and the real-time weather data for a particular time period. An example method can also comprise receiving, by the computing device, second information associated with an environmental management zone. The second information can comprise a change to the received first information. An example method can further comprise updating the nitrogen outcome probability based on the received second information.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5A is a diagram illustrating a first pre-season planning field map;

FIG. 5B is a diagram illustrating a second pre-season planning field map;

FIG. 5C is a diagram illustrating a third pre-season planning field map;

FIG. 12 is a diagram illustrating another example user interface;

FIG. 16 is a diagram illustrating another example user interface;

FIG. 18 is a flowchart illustrating an example method for land management;

FIG. 19 is a flowchart illustrating another example method for land management;

FIG. 20 is a flowchart illustrating yet another example method for land management; and FIG. 21 is a block diagram illustrating an example computing device in which the present methods and systems can operate.

DETAILED DESCRIPTION

Figure 1:
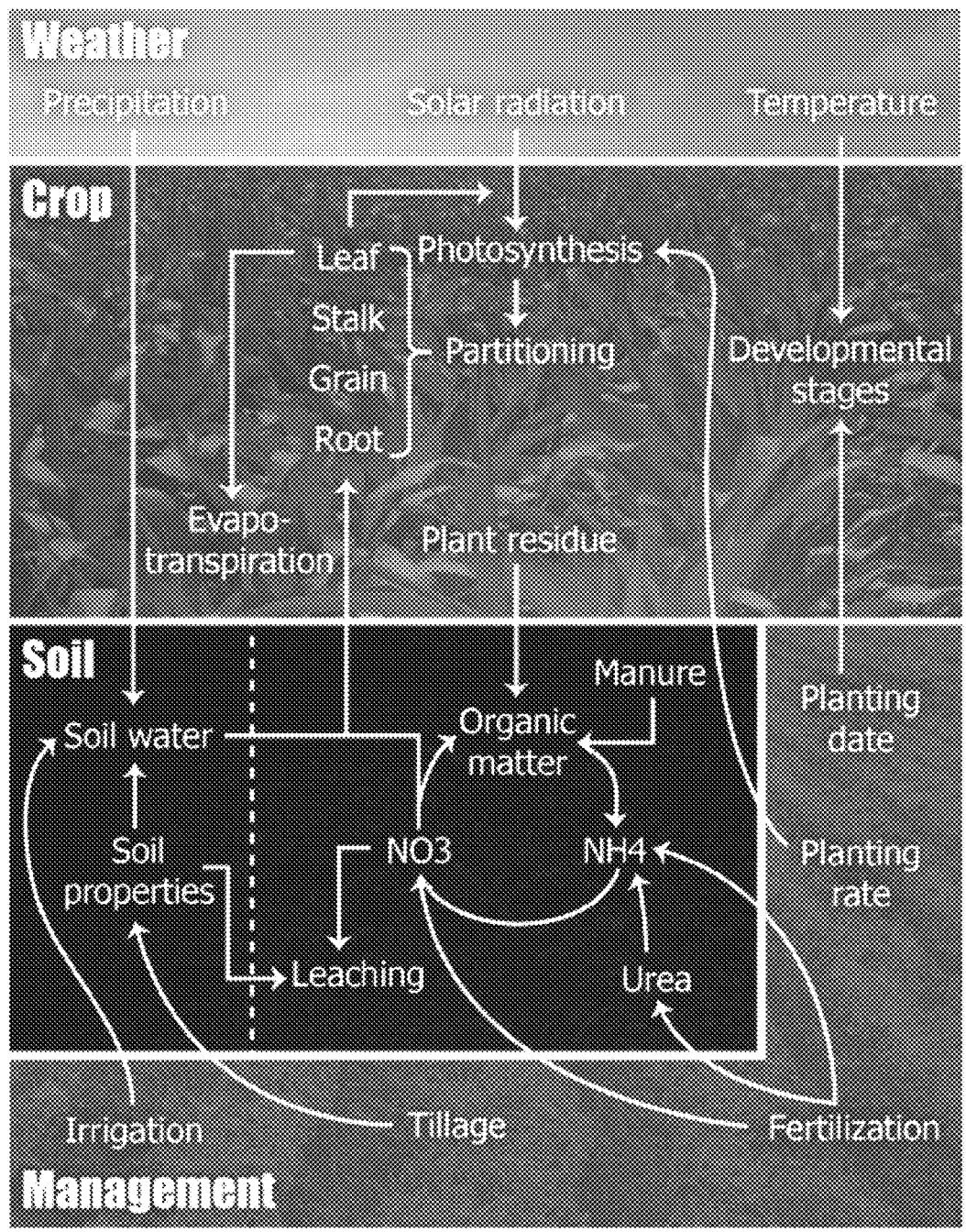
FIG. 1 is a chart illustrating factors affecting crop growth and nitrogen availability in the crop and soil model.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Nitrogen is an important crop production input and can be one of the major mineral nutrients that farmers manage to achieve high yields. Nitrogen management, however, can be among the most complex and uncertain agronomic aspects of modern farming. Large quantities of organic nitrogen can be present in soils, but a small and highly variable fraction of this nitrogen is mineralized each growing season into inorganic forms that are available for crop uptake. Inorganic nitrogen, originating from the soil or from fertilizers, can be readily available to crops, but can be highly susceptible to losses. To add to this complexity, all of the processes that control nitrogen availability and loss vary by soil type, moisture, temperature and other factors. Because of the multifaceted and dynamic nature of nitrogen, farmers regularly over-fertilize and/or under-fertilize in any given field or year, reducing profitability and/or leading to excess nitrogen application. For example, farmers might apply nitrogen at rates in excess of what is optimal in years when climatic conditions support high levels of soil nitrogen mineralization. Farmers often apply higher than minimally sufficient (e.g., optimal) nitrogen rates because the farmers do not know in advance how much soil nitrogen mineralization might occur in any given year. While the economic penalty resulting from inadequate fertilization can be generally much greater than the cost of excess fertilizer, high fertilizer application rates can be associated with air and water pollution. Given the limited information available to make decisions today, extra nitrogen application is often the economically optimal nitrogen risk management strategy. In one aspect, the present methods and system can provide users, such as farmers, with new insights to help the users make timelier and higher resolution nitrogen management decisions that can better protect profitability and environmental quality. Further, the present methods and systems can be adapted for use with additional crop inputs, such as phosphorous, potassium, organic matter, lime, seed planting density, amount of irrigation, and/or the like.

In one aspect, farmers can be provided with a new ability to plan, monitor and adapt nitrogen management practices to maximize profitability and improve environmental quality in the face of weather uncertainty. The present methods and systems can comprise models, such as growth models. Example growth models can comprise crop and nitrogen models, with high-resolution soil and/or weather data. The models can be used to dynamically forecast soil nitrogen status, providing farmers with essentially real time probabilistic outcomes of their nitrogen levels. One or more computers, such as a cloud-based software platform, may be used to implement the model or models to deliver the results in a real time manner. In one aspect, information regarding probabilistic determinations can be calculated to allow for monitoring and management of soil nitrogen in real-time and for year round planning, which can be calculated on an operational, field, sub-field and/or environmental management zone basis. Alternatively, or additionally, analysis can be conducted at a high resolution spatial-scale by using environmental management zones. The environmental management zones can be based on soil type, topography, hydrology, or some combination of these, classified based on zones that perform in a manner similar to each other based on one or more given environmental factor or factors, such as Nitrogen depletion rate due to water flow. In another aspect, the present methods and systems can be configured to reclassify zone types and/or areas in order to better account for the environmental management zone based on a comparison of the models actual yield data and predicted yield data in seasons.

In one aspect, the present methods and systems can comprise and/or be implemented with one or more models, such as a growth model. An example growth model can comprise a crop and/or soil model configured to simulate all aspects of crop growth and development, including grain yield at harvest, and/or the like for a specific set of soil characteristics and under defined management and weather conditions. In one aspect, an example model can directly account for, predict, and/or the like changes in soil water and nitrogen that occur over time in response to crop growth, management and weather (e.g., FIG. 1). FIG. 1 is chart illustrating factors affecting crop growth and nitrogen availability in the crop and soil model.

In one aspect the present methods and systems can comprise one or more models, such as a Crop Environment Resource Synthesis (CERES) maize model, CENTURY model, and/or the like. These models can be adapted to dynamically use high-density weather data, updated on a daily basis or real-time basis, to reforecast soil nitrogen for the environmental management zone. In one aspect, a network of weather stations, including those positioned on or near the farms where the environmental management zone is located, may be used. For example, weather data can be collected, such as historical weather information specific to a particular area, such as a field boundary, environmental management zone, and/or the like.

The dynamic nature of the present methods and systems, combined with high density weather data, can enable a user to monitor changes in soil nitrogen status and assess the impacts of potential management actions in real time. The present methods and systems can be implemented across a broad geographic range while incorporating soil, weather and management information for specific fields. The present methods and systems can be tested and adapted to predict nitrogen availability across a wide range of soil, climatic and management conditions (e.g., FIG. 2).

Figure 2:
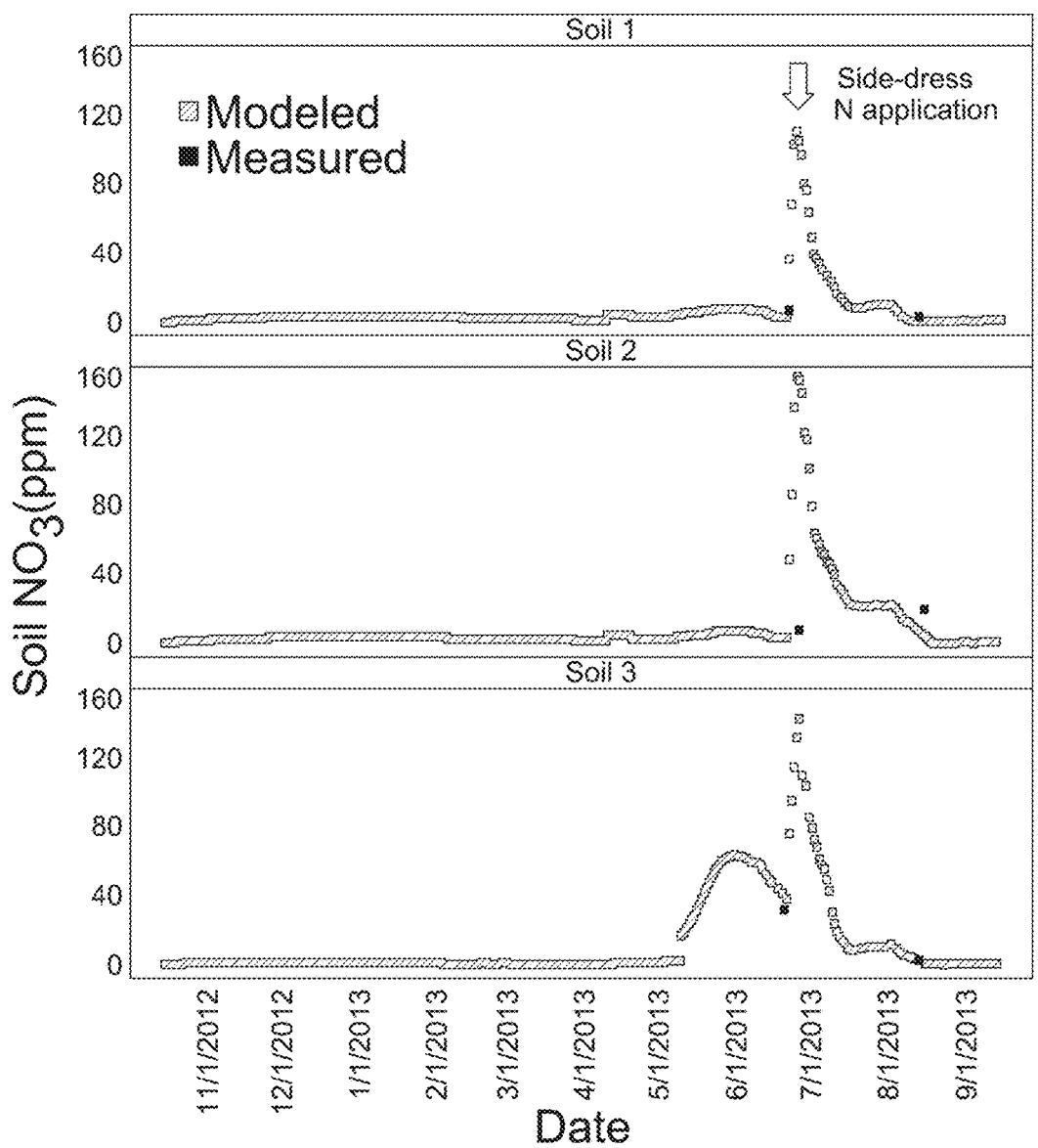
FIG. 2 is a graph illustrating modeled and measured soil $NO_3-$ concentration.

FIG. 2 is a graph illustrating modeled and measured soil $NO_3^-$ concentration to a 12" depth for three soils in fields. In one aspect, the one or more models can account for nitrogen in various forms, including anhydrous ammonia and/or manure fertilizer. In another aspect, the output of the one or more models can be provided to a machine for the automated application of the suggested rate of the nitrogen source.

Figure 3A:
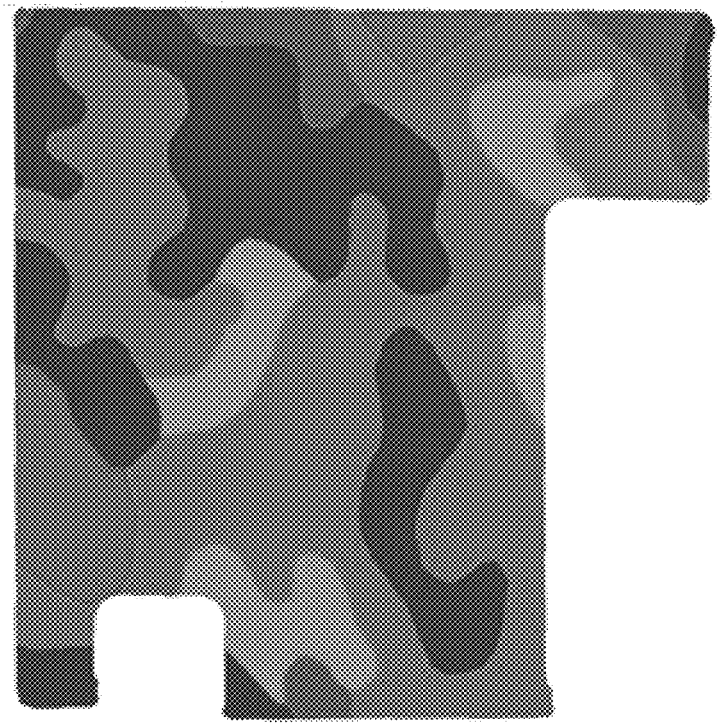
FIG. 3A illustrates an example standard soil map.
Figure 3B:
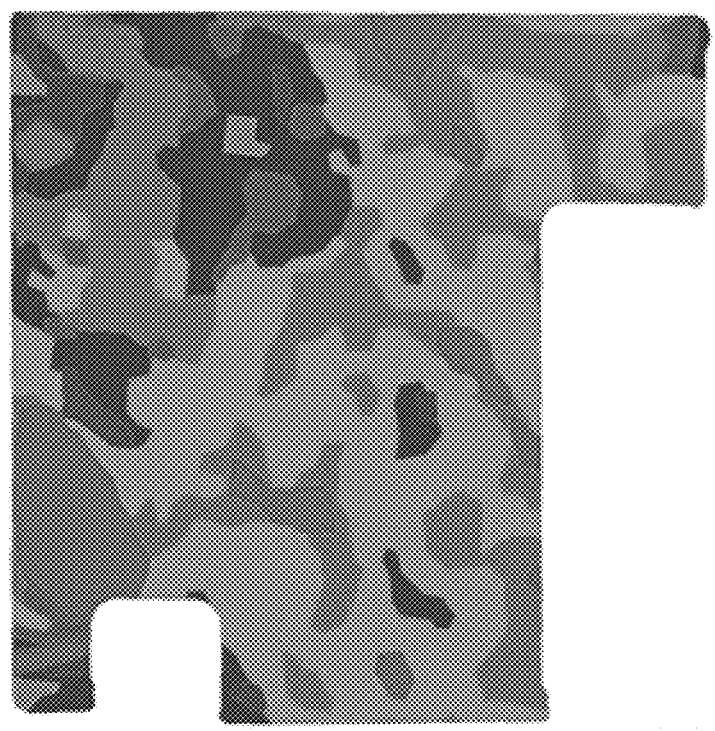
FIG. 3B illustrates an example high resolution zone soil map.

In one aspect, the present methods and systems can use soil maps, such as high resolution soil maps. In one aspect, environmental management zones can be generated using a machine learning clustering algorithm that reclassifies the spatial distribution of soil properties within fields based on digital elevation data, such as high resolution elevation data. These environmental management zones can be identified based on hydrological units or water shed basin. In one aspect, soil type ranges found in the water shed basin in which the environmental management zone is located can be based on the soil characteristics of at least one of soil density, sand-silt-clay value (e.g., percentages or levels of one or more of sand, silt, and clay in the soil), water holding capacity, and/or the like. As an example, water holding capacity can comprise a wilting point, saturation point, and/or the like. The wilting point can comprise the minimum amount of water the soil will hold. The saturation point can comprise the maximum amount of water the soil will hold. Using these soil type ranges can result in a more precise soil map that better reflects field-scale hydrological attributes that strongly influence crop growth and nitrogen availability (e.g., as shown in FIG. 3A, FIG. 3B). In some implementations, an environmental management zone can be supplemented by direct measurement of soil chemical, physical and biological properties using laboratory or direct sensing techniques. In other implementations, the environmental management zones can be recalibrated over time to optimize the ability of the model to predict yield potential based on a set of crop inputs. FIG. 3A and FIG. 3B are example soil maps illustrating a comparison of a standard soil map to a high resolution soil map. FIG. 3A illustrates an example standard soil map. FIG. 3B illustrates an example high resolution zone soil map.

Figure 4:
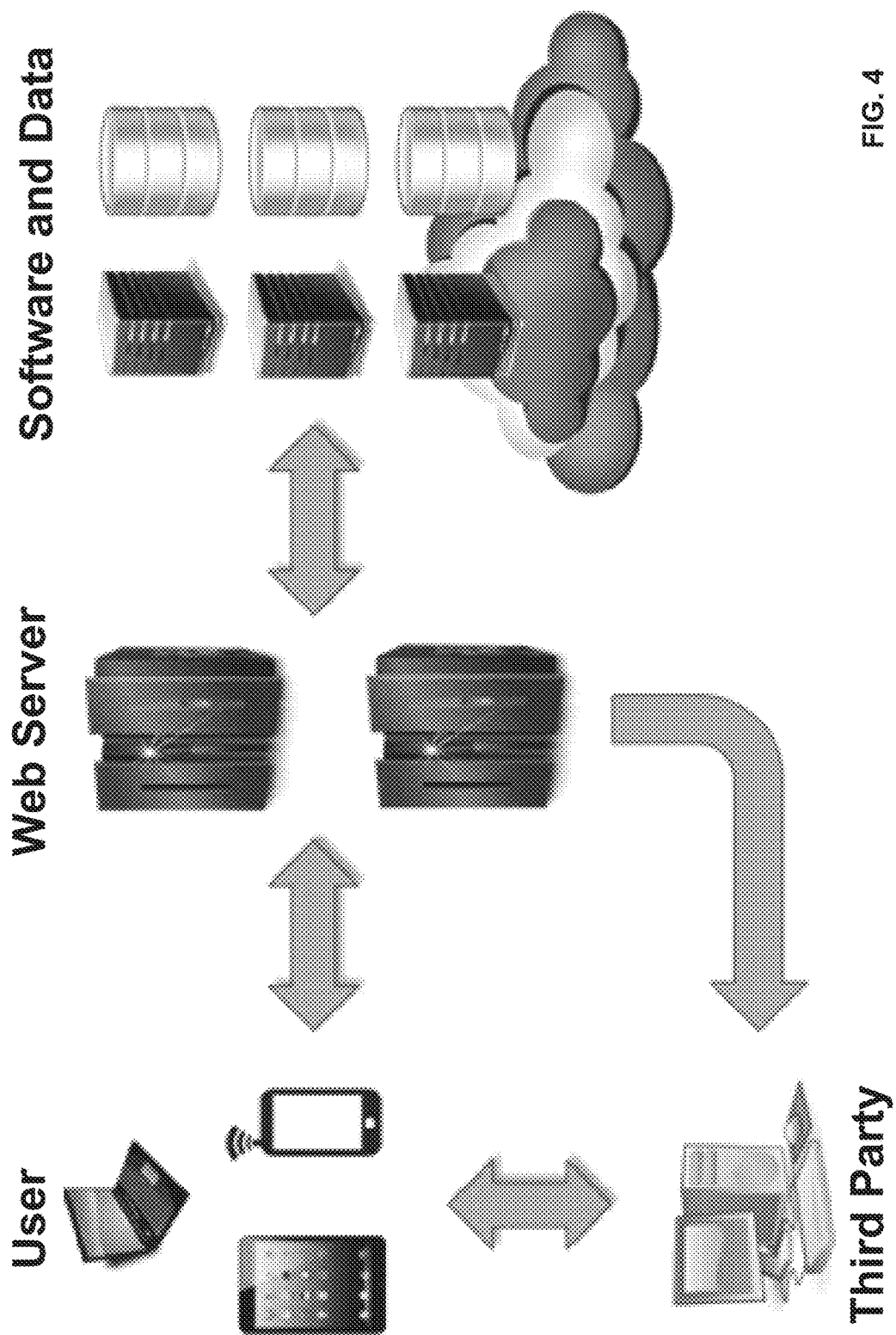
FIG. 4 is a diagram illustrating an example system in which the presents methods and systems can operate.

In one aspect, the one or more models can be computer implemented. In one another aspect, the present methods and systems can use a cloud computing framework to manage weather, soil and operational data for e.g., one or more environmental management zones on a regular basis (e.g., hourly, daily, weekly, monthly, yearly), while also giving users access to real-time soil nitrogen status updates via applications, such as web browsers and mobile applications (e.g., as shown in FIG. 4). FIG. 4 is a diagram illustrating an example system in which the presents methods and systems can operate. In one aspect, users can have the option to automatically share information (e.g., graphs, charts, predictions, management plans) and suggestions generated by the service with third parties involved in management of the field. In scenarios where the one or more model operates from one or more remote computing devices, changes made to the one or more models and related software (e.g., soil mapping software) may be delivered to users without substantially interruption of service.

In one aspect, the present methods and systems can be configured to help users plan, monitor and adapt management practices, such as nitrogen management practices, to help maximize profitability in the face of climatic uncertainty. The present methods and systems can be regularly used from fall through spring, as well as during other times and seasons, to assist in the development of management plans. These management plans can comprise guidance regarding the least-risk dates for targeting nitrogen applications, as well as the overall risk that yields will be limited by nutrient availability (e.g., nitrogen availability) given historic weather conditions at the location. In one aspect, with just a keystroke, a user can use the present methods and systems to access soil nutrient forecasts for any management plan the user has created and compare the current risk profile of the management plan against alternative management scenarios (e.g., FIG. 5A, FIG. 5B, FIG. 5C), or generate a variable rate suggestion for in-season nutrient application at any future date (e.g., FIG. 6). For example, nutrient application can comprise an amount applied, a form of application, and/or a timing of application of a nutrient, such as least one of nitrogen, phosphorus, potassium, lime, water, and/or the like.

In one aspect, the present methods and systems can use data of previous weather years to enables dynamic and risk-based management planning. When a user creates or accesses a management plan, the model can be run from a remote device (e.g. from the cloud) to simulate soil nutrient availability from that date forward based on each of the previous years of weather data. Risk-based management planning can also use weather and/or climate forecast models in addition to or instead of prior weather data. In one aspect, 5 or more years of weather data can be used. In another aspect, 10 or more years of weather data can be used. In another aspect, 15 or more years of weather data can be used. In another aspect, 20 or more years of weather data can be used. In another aspect, 25 or more years of weather data can be used. In another aspect, 30 or more years of weather data can be used. In another aspect, 35 or more years of weather data can be used. In another aspect, 40 or more years of weather data can be used. In another aspect, 45 or more years of weather data can be used. In another aspect, 50 years of weather data can be used. In another aspect, 50 or more years of weather data can be used. In another aspect, years with similar weather patterns can be used. As a result of the use of a range of possible future weather outcomes based on probabilities calculated from historical data, the one or more models can estimate the risk of yield-limiting soil nutrient levels, while also factoring in observed weather and agricultural practices and nutrient application to the current date (e.g., FIG. 7). By simulating a wide range of possible weather outcomes, the model can provide users the ability to assess and compare the financial risks associated with different management plans, and to make quantitative, risk-based management decisions in real-time.

Figure 6:
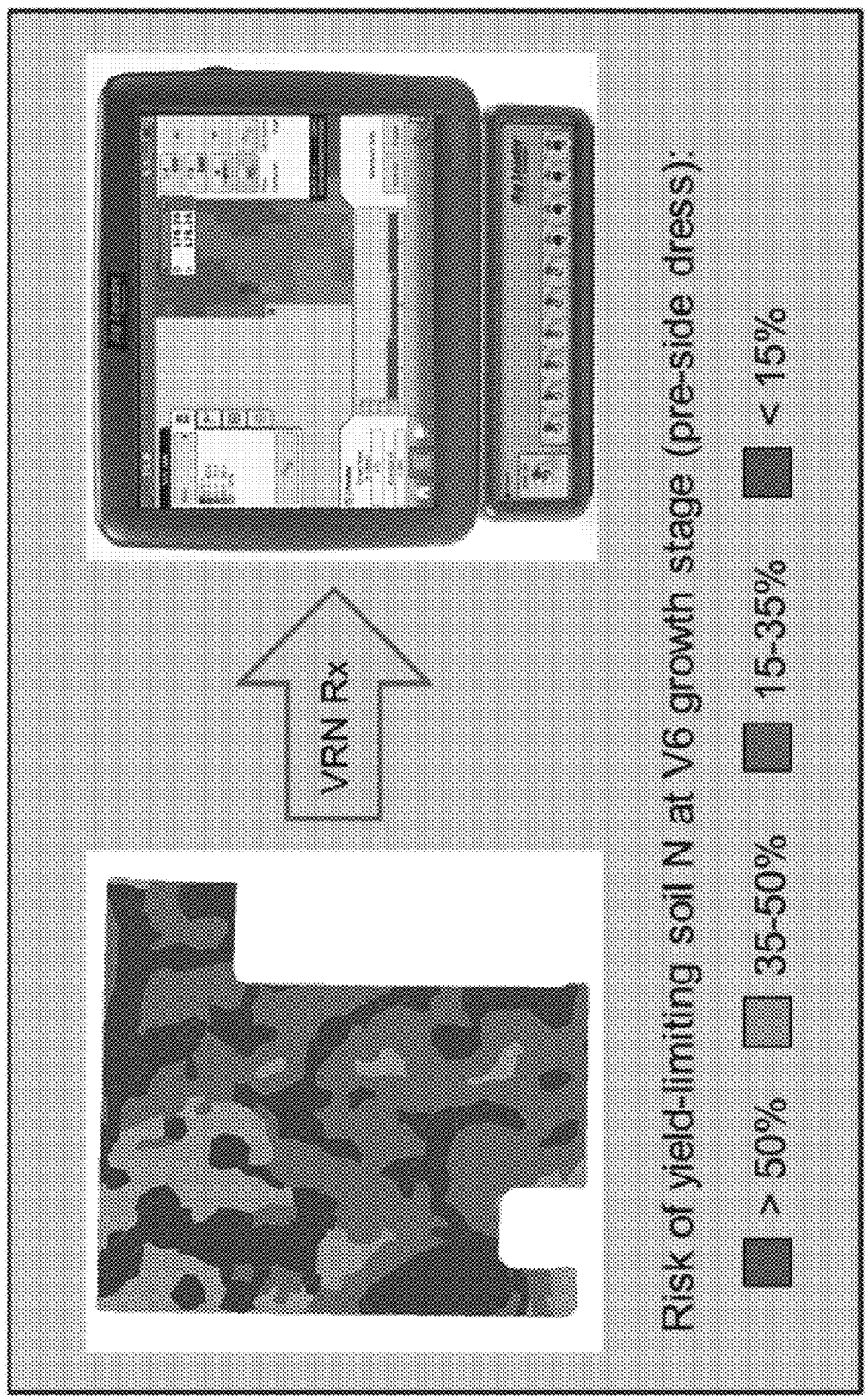
FIG. 6 is a diagram illustrating a pre-side-dress environmental management zone based field map showing the risk of yield-limiting soil nitrogen at V6 corn growth stage.
Figure 7:
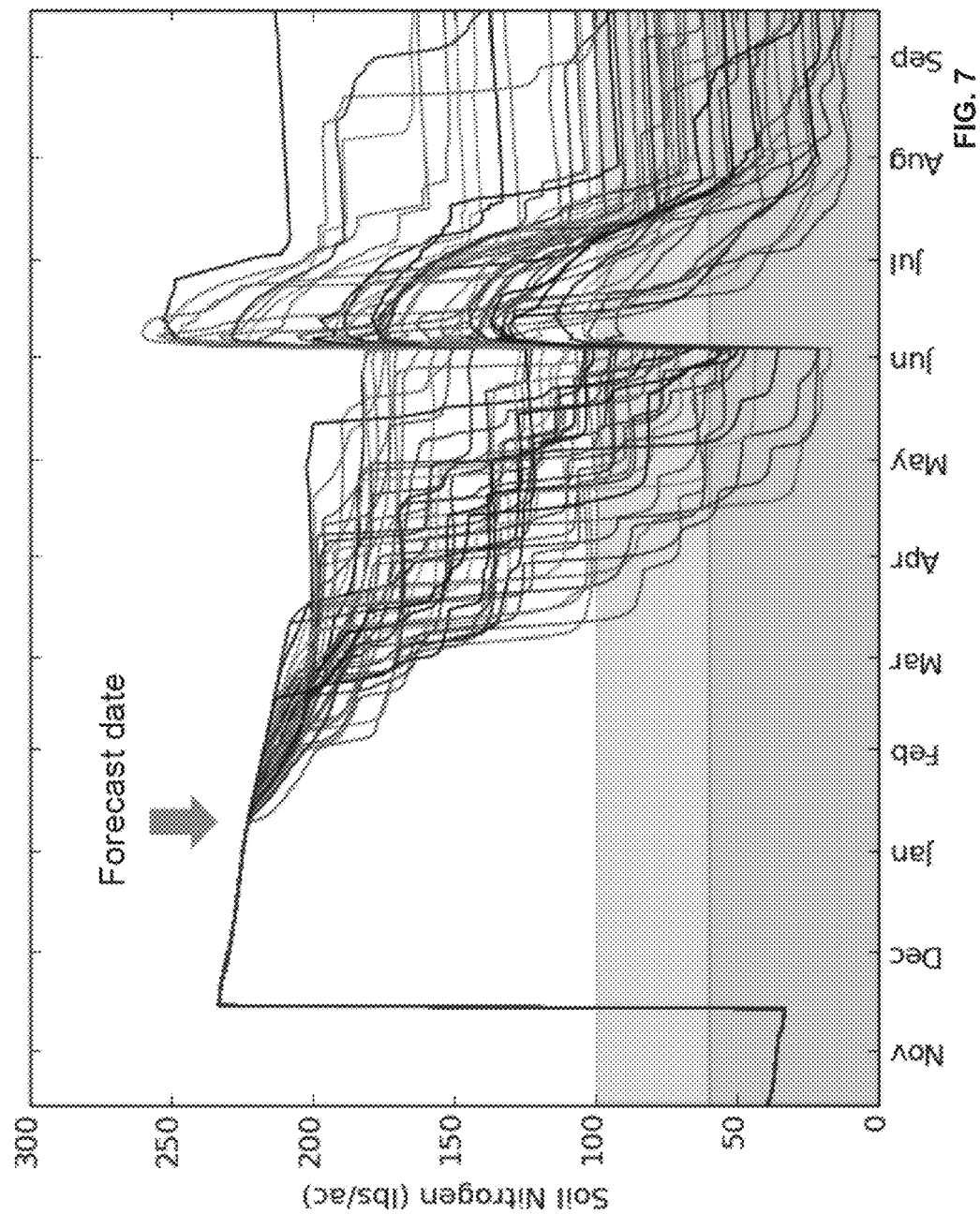
FIG. 7 is a graph illustrating a soil nitrogen forecast for a single environmental management zone based on 50 years of historical weather.

FIG. 5A is a diagram illustrating a first pre-season planning field map. FIG. 5B is a diagram illustrating a second pre-season planning field map. FIG. 5C is a diagram illustrating a third pre-season planning field map. The pre-season planning maps show risk of yield-limiting soil nitrogen at V6 (pre-side-dress) corn growth stage for three different nitrogen management plans forecasted for the same field on Nov. 1, 2013. FIG. 6 is a diagram illustrating a pre-side-dress environmental management zone based field map showing the risk of yield-limiting soil nitrogen at V6 (pre-side-dress) corn growth stage, and ability to generate variable rate nitrogen suggestions. FIG. 7 is a graph illustrating soil nitrogen forecast for a single environmental management zone based on 50 years of historical weather.

In one aspect, users can access the software components of the one or more models via a user interface, such as a web interface (e.g., as shown in FIG. 8-FIG. 16). The user interface can be connected directly to other agronomic, business, and/or logistical services.

In one aspect, the user interface can be configured to provide access to one or more of the following features: 1) real-time soil nitrogen levels for the currently selected field and/or environmental management zone; 2) historical crop, yield and management information for the currently selected field and/or environmental management zone; 3) a map of the currently selected field with real-time soil nutrient (e.g., nitrogen) levels displayed for each environmental management zone within the field; 4) drop-down menus allowing users to quickly navigate between fields; 5) a nutrient planning tool that allows users to enter application dates, methods and quantities to generate a plan for the currently selected field; 6) a risk profile for the currently selected plan and field; 7) a link to calendar tool for planning target application dates (e.g., for providing the nutrient to specified areas of an environmental management zone), and/or the like.

Figure 8:
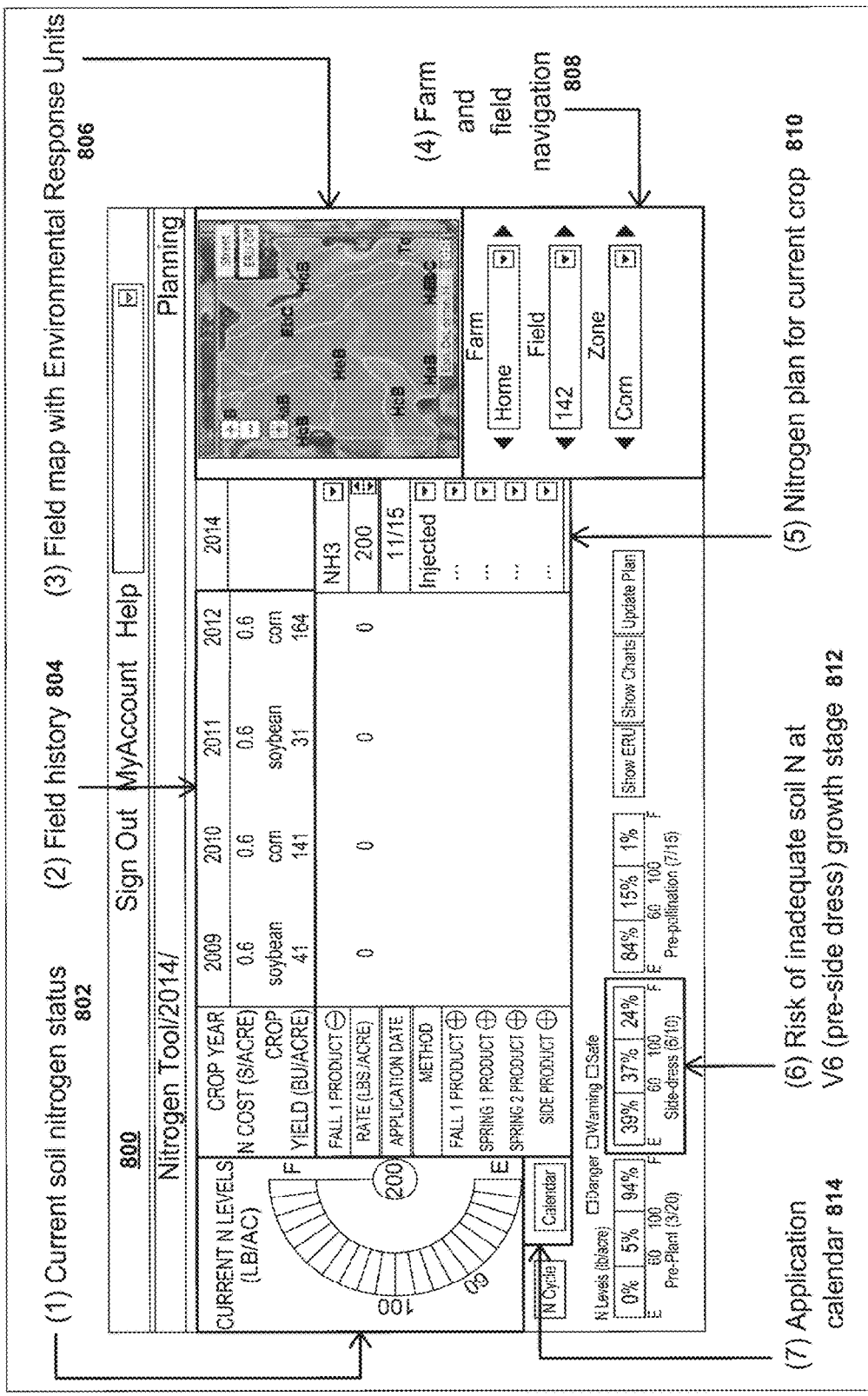
FIG. 8 is a diagram illustrating an example user interface.

FIG. 8 is a diagram illustrating an example user interface 800. The user interface can comprise a variety of user interface elements configured to provide information. For example, the user interface elements can show, current soil nutrient status 802, field history 804, field map with environmental response units 806 (e.g., management zones), a navigation element 808 for selecting various farms and fields, a nutrient (e.g., nitrogen) plan for a current crop 810, a predicted risk profile for display risks of inadequate nutrients 812, a calendar 814 illustrating plans for applying nutrient and other management practices, and/or the like.

Figure 9:
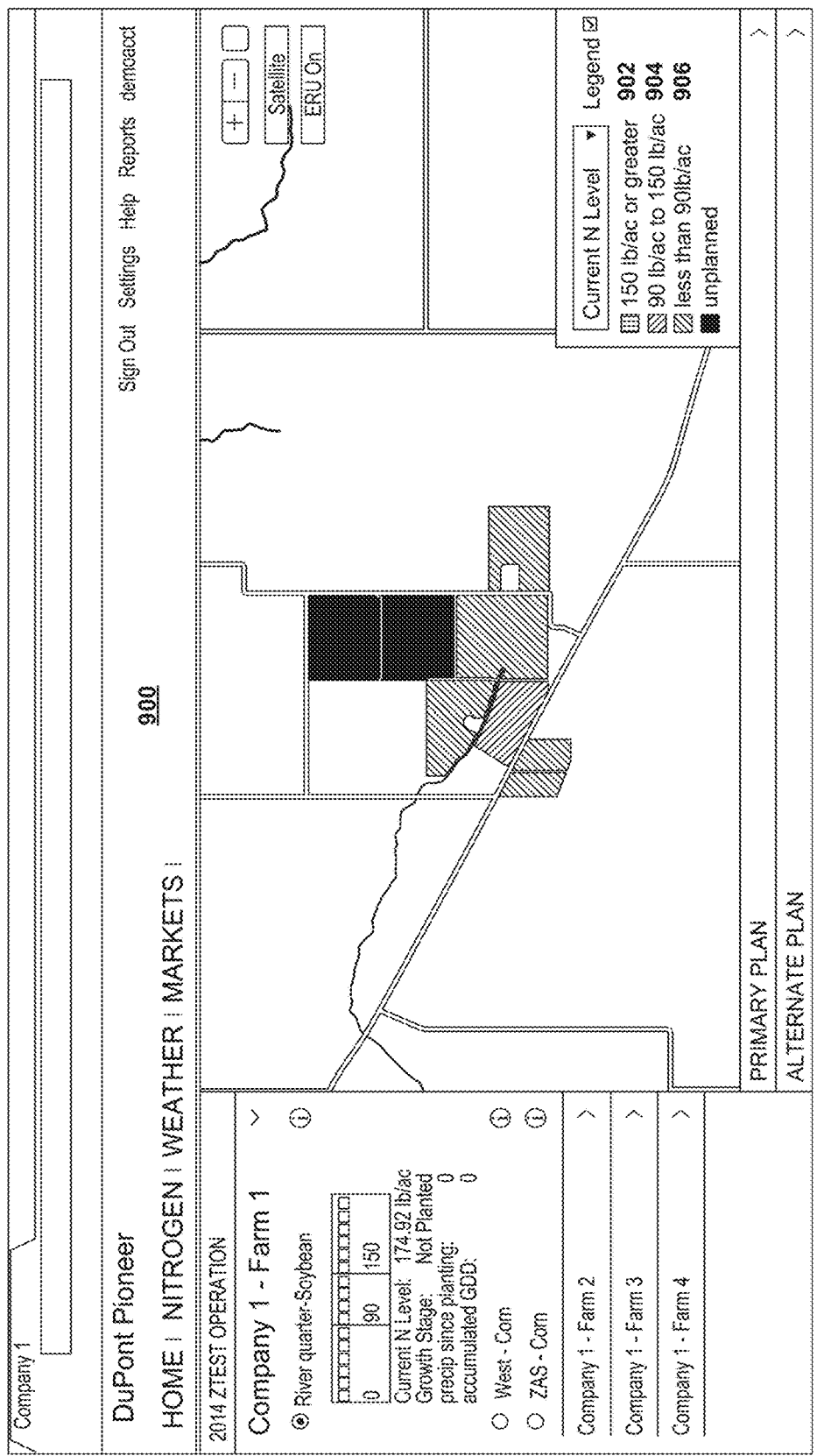
FIG. 9 is a diagram illustrating another example user interface.
Figure 10:
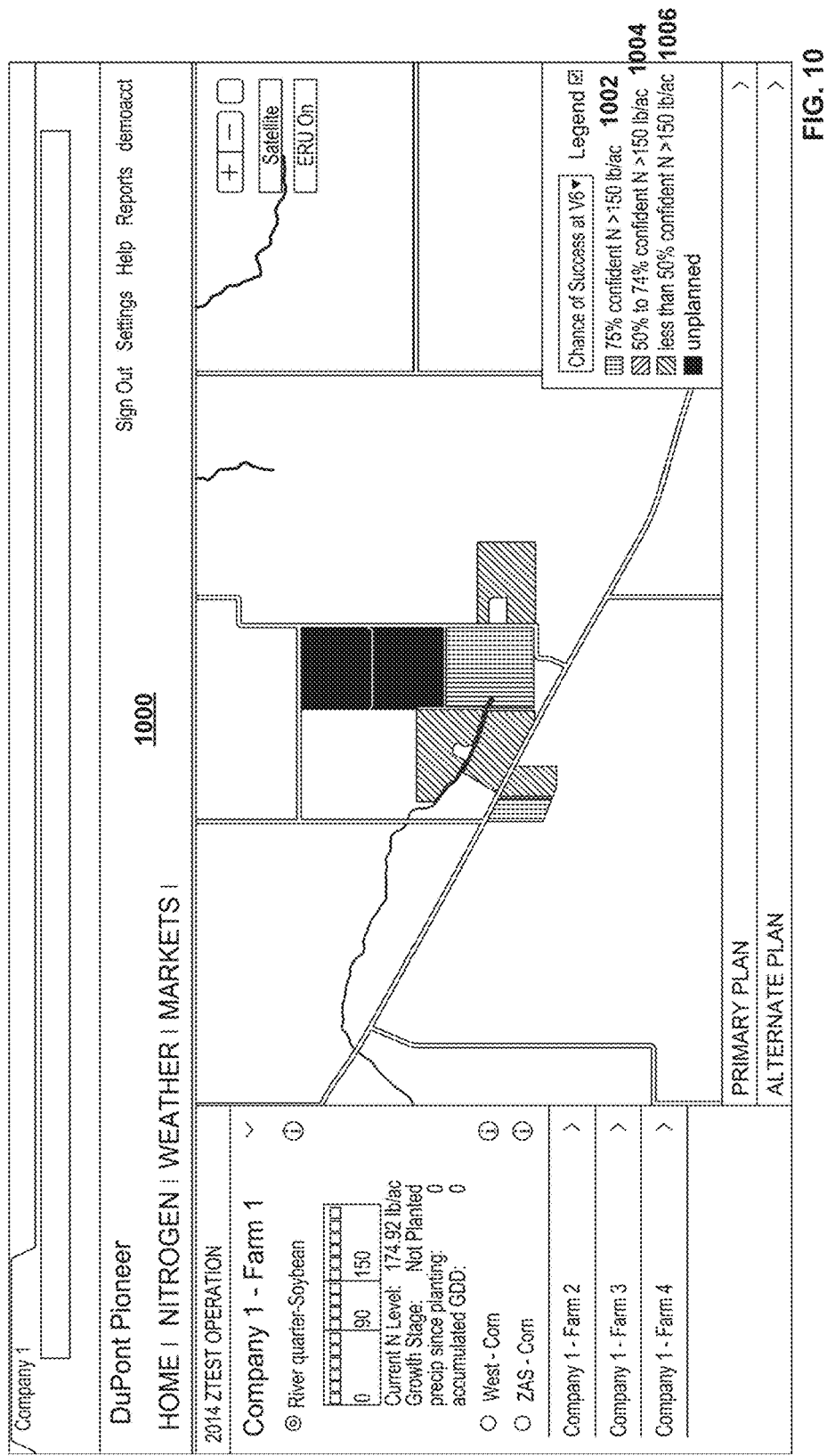
FIG. 10 is a diagram illustrating another example user interface.

FIG. 9 is a diagram illustrating another example user interface 900. The user interface 900 can show nutrient levels 902, 904, 906 based on environmental management zones, or as shown in FIG. 9, on larger areas, made up of several environmental management zones. FIG. 10 is a diagram illustrating another example user interface 1000. In one aspect, the user interface 1000 can be configured to display one or more probabilities (e.g., predictions) 1002, 1004, 1006.

Figure 11:
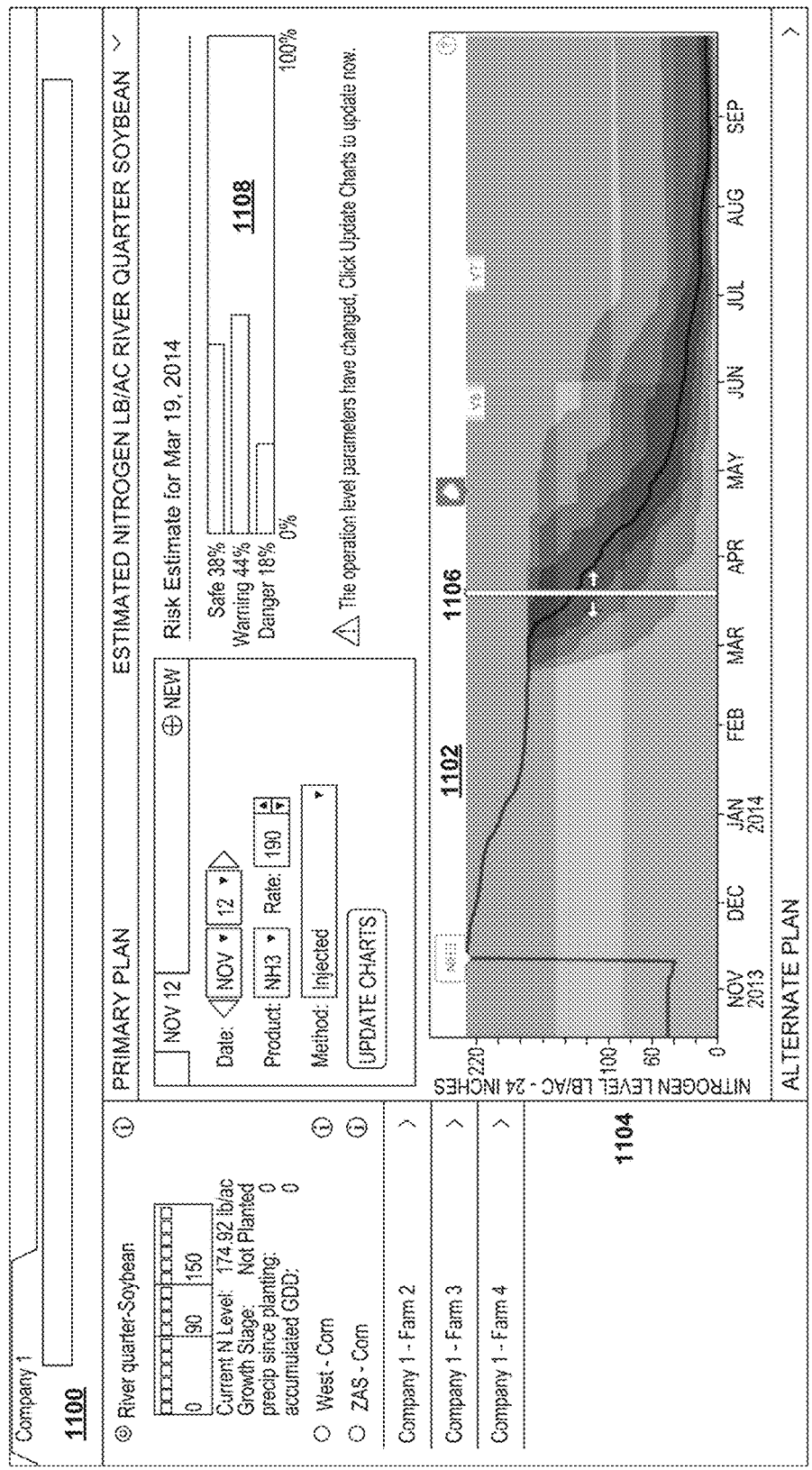
FIG. 11 is a diagram illustrating another example user interface.

FIG. 11 is a diagram illustrating another example user interface 1100. The user interface 1100 can be configured to show a graph 1102 of a step down, or decrease of nutrients, at the plant V6 stage of development. The graph 1102 can display nitrogen levels 1104 over time for a management plan. In one aspect, the user interface can comprise a slider bar 1106. The slider bar 1106 can be moved left and right to select a predicted range of nutrient levels (e.g., nitrogen levels) at different points in time. For example, the slider bar 1106 can be configured to select one or more days of the year. Information related to the selected one or more days can be displayed. As an example, the displayed information can comprise risk profiles 1108 indicative of predicted nutrient levels. For example, a risk profile 1108 can comprise one or more probabilities that nutrient levels will be within a certain risk category (e.g., safe, warning, danger). One or more (or each) nutrient level point of the graph 1102 can be calculated based on a probability of outcomes generated based on actual in season data (e.g., plant growth stage, precipitation since planting, accumulated growing degree days), soil type determined by environmental response zone, high resolution historical weather data for the zone, and/or the like.

Figure 13:
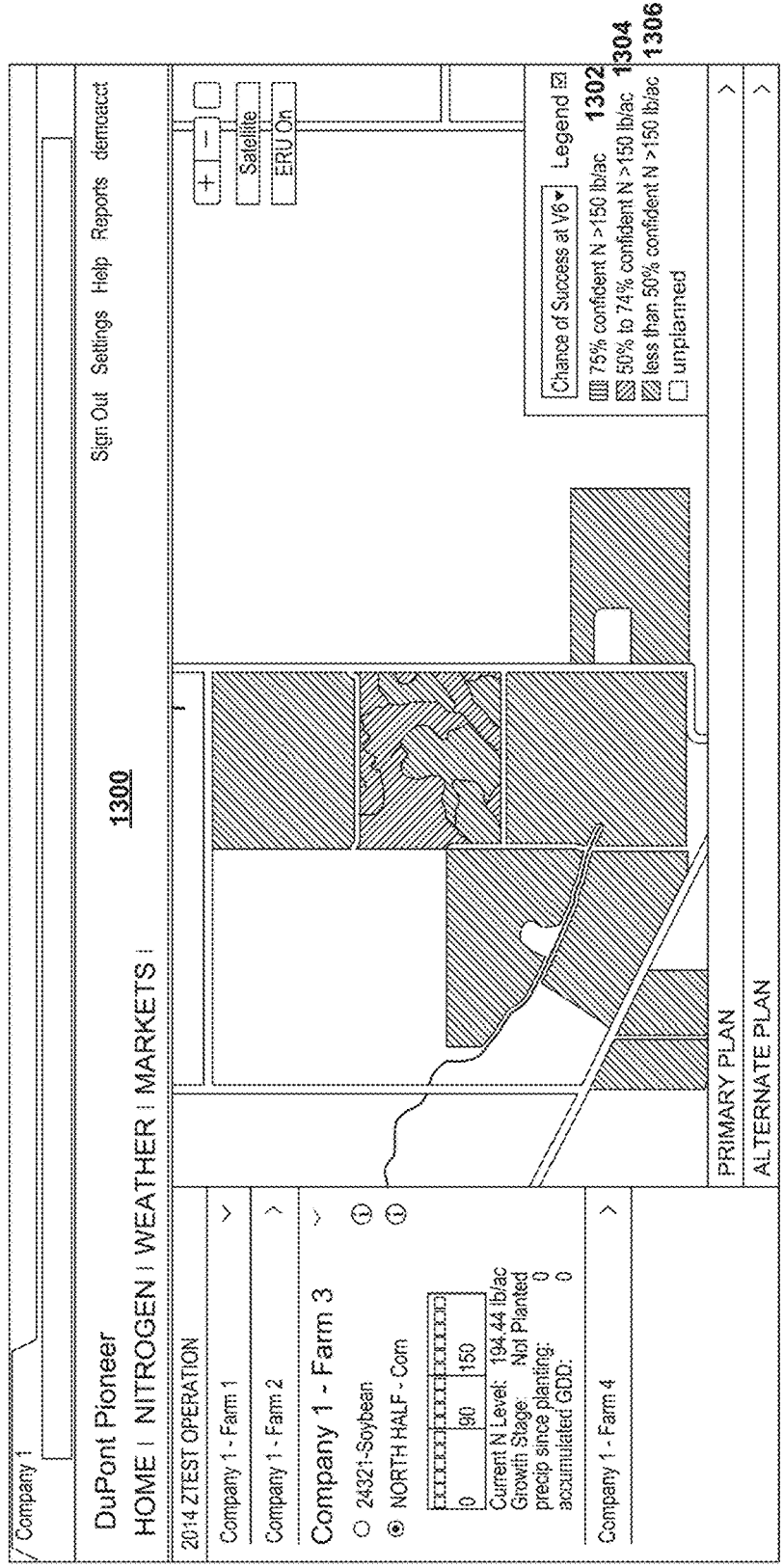
FIG. 13 is a diagram illustrating another example user interface.

FIG. 12 is a diagram illustrating another example user interface 1200. This user interface 1200 can show risk profiles for a primary management plan and for an alternative management plan based on historical weather data and actual management practices to date. In certain scenarios, the alternative management plan can suggest a greater financial benefit while maintaining or enhancing yield in comparison to the primary management plan. As an example, the primary management plan can be based upon a user's hypothetical planned practice. FIG. 13 is a diagram illustrating another example user interface 1300. The user interface 1300 can show a probabilistic nutrient outcome 1302, 1304, 1306 based on predicted weather determined in part with historical weather data. The user interface 1300 can illustrate different nutrient levels predicted within different adjacent environmental management zones.

Figure 14:
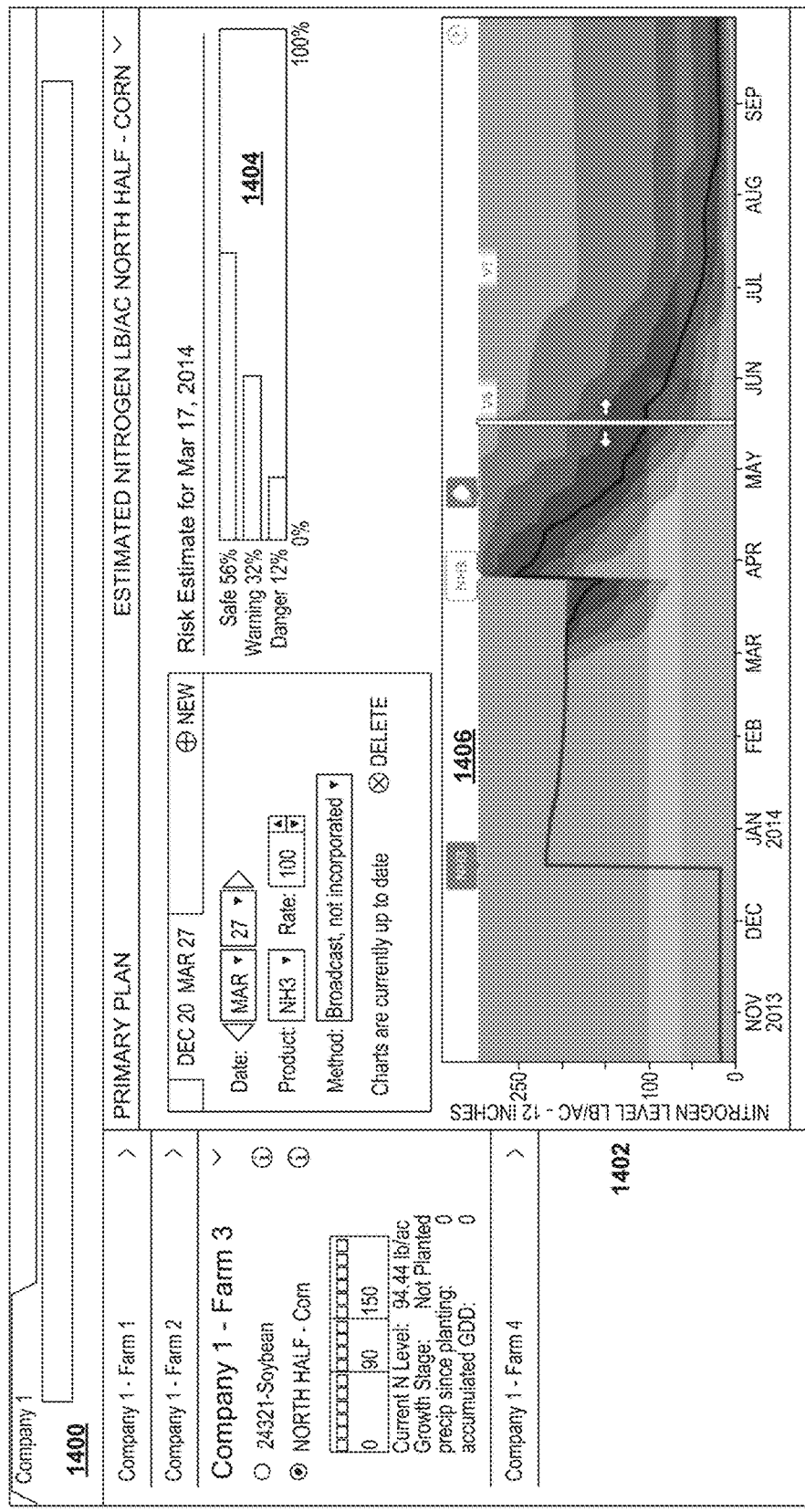
FIG. 14 is a diagram illustrating another example user interface.
Figure 15:
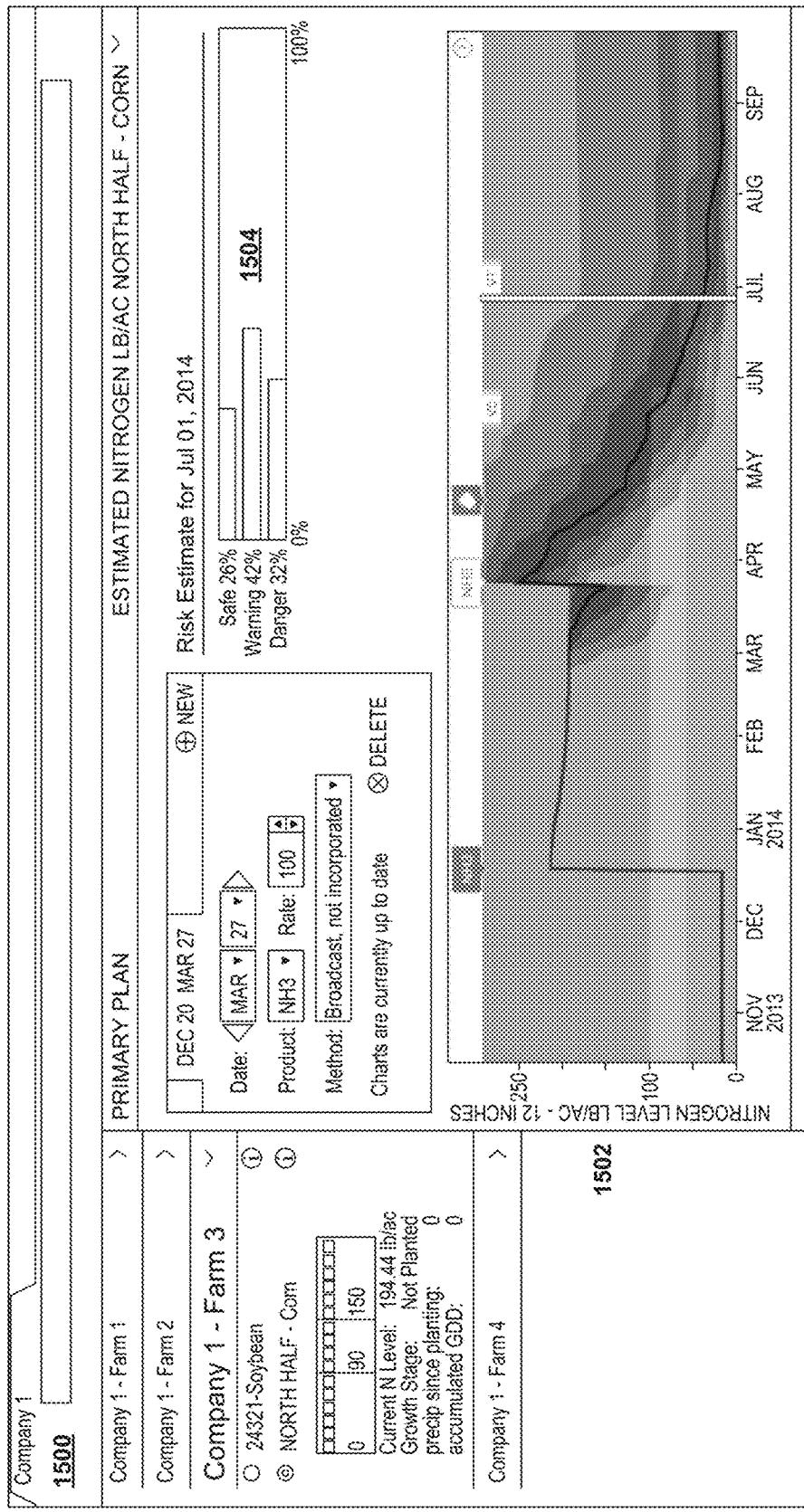
FIG. 15 is a diagram illustrating another example user interface.

FIG. 14 is a diagram illustrating another example user interface 1400. The user interface 1400 can be configured to show predictions (e.g., based on the one or more models) of nutrient levels 1402 and risk profiles 1404 for a time period immediately prior to the V6 stage of plant growth. For example, the user interface 1400 can comprise a graph 1406 configured to display ranges of predicted nitrogen levels for each day. FIG. 15 is a diagram illustrating another example user interface 1500. The user interface 1500 can be configured to show predictions (e.g., based on the one or more models) of nutrient levels 1502 and risk profiles 1504 for a time period immediately prior to the VT stage of plant growth. The user interface 1500 can be used to assess differences between predicted nutrient levels and risk profiles at other times, such as prior to the V6 stage as shown in FIG. 15. FIG. 16 is a diagram illustrating another example user interface 1600. The user interface 1600 can be configured to display a settings page that allows a user to enter costs of nutrients 1602, (e.g., nitrogen, fertilizer, water), application costs 1604, and/or the like which can be used to calculate financial profit or loss and to calculate risk estimate.

Figure 17:
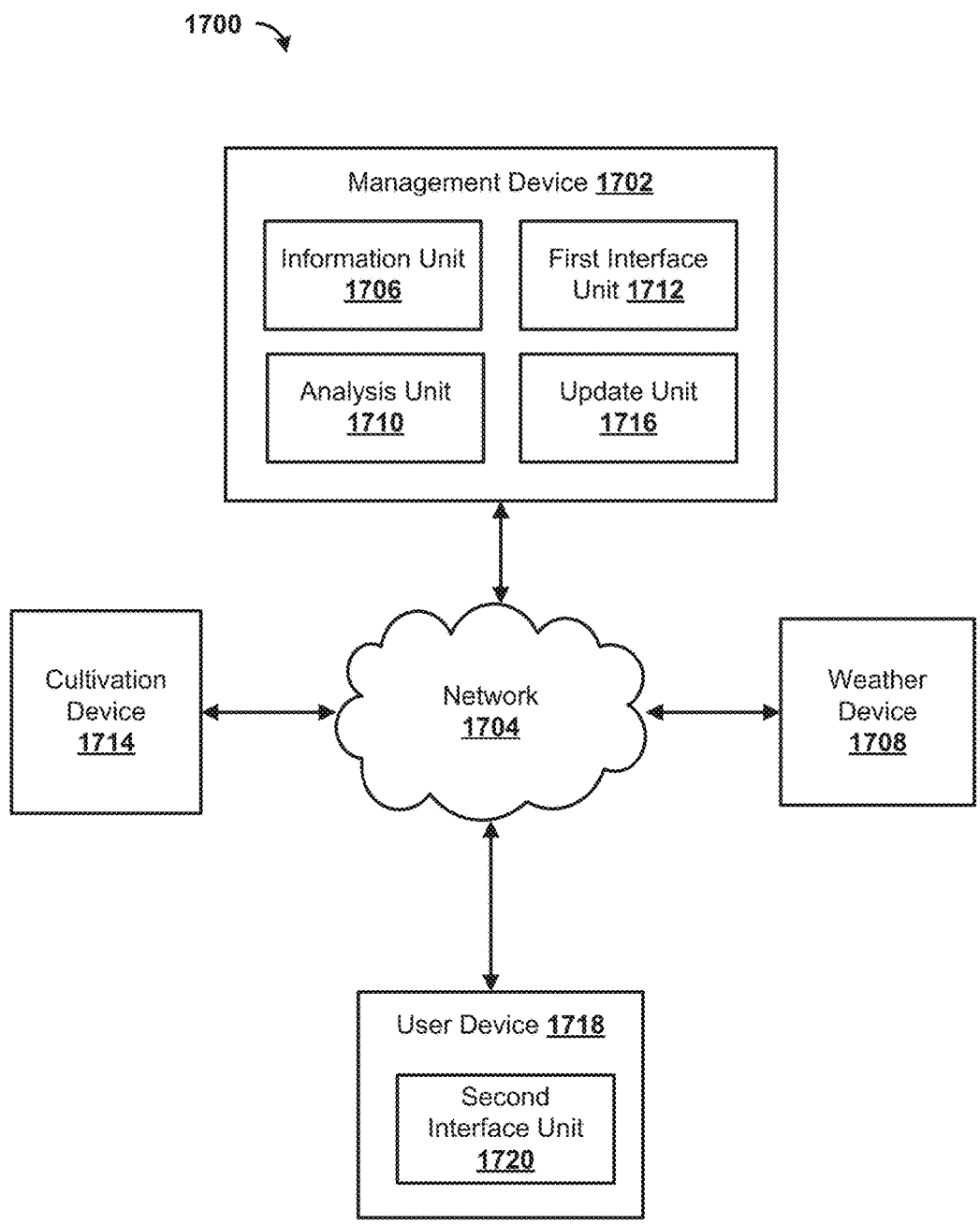
FIG. 17 is a block diagram illustrating an example system for land management.

FIG. 17 is a block diagram illustrating an example system 1700 for land management. For example, the system 1700 can be configured to provide predictions and other analysis regarding land conditions, such as the presence of a substance in soil.

In one aspect, the system 1700 can comprise a management device 1702 configured to receive and provide information related to land, soil, crops, weather, and/or the like through a network 1704. In one aspect, the network 1704 can comprise a packet switched network (e.g., internet protocol based network), a non-packet switched network (e.g., quadrature amplitude modulation based network), and/or the like. The network 1704 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 1704 can be configured to provide communication from telephone, cellular, modem, and/or other electronic devices to and throughout the system 1700.

In one aspect, the management device 1702 can comprise an information unit 1706 configured to store information. For example, the information unit 1706 can comprise a database, table, file, and/or the like. In one aspect, information can comprise data indicative of and/or associated with an environmental management zone (e.g., farm management zone). An environmental management zone can be subdivided into a plurality of portions with associated data for one or more (or each) of the portions. For example, the information can comprise physical boundaries, elevation data, ownership data, planting data, soil data, nutrient data (e.g., nitrogen content), and/or the like information indicative of one or more environmental management zones. The nutrient levels in different portions of an environmental management zones can change even though the same management plan is implemented across all areas of the environmental management zone. In another aspect, the information can comprise weather data. The weather data can comprise historic weather data, real-time current weather data, future weather data (e.g., predicted weather), and/or the like. For example, the system 1700 can comprise a weather device 1708 configured to provide weather data. The management device 1702 can request and/or receive the weather data from the weather device 1708. The weather device 1708 can comprise a computing device managed by a weather service (e.g., weather station). The weather device 1708 can comprise one or more weather measuring instruments, such as a barometer, humidity sensor, rain sensor, temperature sensor, and/or the like. For example, the weather data can comprise satellite data, temperature data, rain levels, flooding information, and/or the like. The weather data can comprise timing information, location information, and/or the like that can be configured for correlating the weather data with the other information, such as environmental management zone data.

In one aspect, the information can comprise user data indicative of one or more users. For example, the information can comprise user credentials (e.g., login, password), account history, subscription data, user preferences, and/or the like. The user data can be associated with the other portions of the information such that a user can access environmental management data associated with the user. For example, an agent of a farm or other environmental management zone can be associated with information related to the environmental management zone.

In one aspect, the information can comprise management information, such as a management plan, associated with one or more environmental management zones. A management plan can comprise plans for a variety for management practices, such as watering, applying nutrients (e.g., nitrogen, fertilizer, phosphorus, potassium, lime, water), applying pesticide, tilling, harvesting, plowing, planting, and/or the like. For example, the management plan can comprise location information, timing information indicating time and place that various portions of the plans are to be carried out. In one aspect, the management plan can be associated with one or more users. For example, an environmental management zone can be associated with one or more management plans. An environmental management zone can be associated with one or more users.

In one aspect, the management device 1702 can comprise an analysis unit 1710 configured to process (e.g., analyze) information, such as information stored by information unit 1706. In one aspect, the analysis unit 1710 can be configured to determine one or more predictions (e.g., predicted values) of future conditions of an environmental management zone.

The predictions can comprise data values, maximum predicted values, minimum predicted values, a predicted range for a value, and/or the like. The analysis unit 1710 can determine the prediction of future conditions based one or more models, such as growth models (e.g., plant growth models), soil models, weather models, and/or the like. For example, the analysis unit 1710 can determine predictions of one or more ranges, values, and/or the like of future weather for the environmental management zone. As an illustration, the predictions can comprise one or more (e.g., a series of) probabilities for one or more of a current time period and a future time period in the growing season. The analysis unit 1710 can determine predictions of a variety of characteristics, such as soil conditions (e.g., pH level, percentage of organic matter), nutrient conditions (e.g., nitrogen content, phosphorus level, potassium level, fertilizer, lime level), moisture conditions (e.g., water holding capacity, amount of water in the soil), growth conditions (e.g., plant growth or yield), and/or the like. In one aspect, the predictions can be determined based on weather data (e.g., historical, real-time current, future), location data, elevation data, soil data, any other information described herein, and/or the like. For example, the analysis unit 1710 can be configured to predict future weather based on historical weather data and/or real-time current weather data. As a further illustration, a prediction can comprise a predicted future soil nutrient (e.g., nitrogen) availability, soil nutrient (e.g., nitrogen, fertilizer, phosphorus, potassium, lime, water) level, plant nutrient intake, and/or the like.

In one aspect, the analysis unit 1710 can be configured to determine (e.g., generate, receive, calculate, access) one or more risk profiles for a management plan. The risk profiles can be determined based on the one or more models. For example, the analysis unit 1710 can determine a risk profile of yield-limiting soil nutrient levels. The risk profile can comprise probabilities that specific conditions will occur (e.g., nitrogen levels will be low enough to limit plant growth yields) in various portions of the environmental management zone. The risk profile can comprise different probabilities for different portions of the environmental management zone. The risk profile can be determined based upon the predicted future soil nutrient availability, soil nutrient level, plant nutrient intake, and/or the like.

In one aspect, the analysis unit 1710 can be configured to compare information. For example, the analysis unit 1710 can be configured to compare management plans, risk profiles, predicted growth profile, and/or the like for one or more environmental management zones. For example, the analysis unit 1710 can determine one or more comparative metrics to illustrate differences in predicted conditions of the environmental management zone.

In one aspect, the management device 1702 can comprise a first interface unit 1712 configured to manage user interactions with the management device 1702. For example, the first interface unit 1712 can be configured to provide computer readable code configured to instruct a user device to render a user interface on a display. The user interface can comprise a variety of interface elements, such as windows, buttons, graphical elements (e.g., graphs, pictures), text boxes, text, and/or the like. The user interface can be configured to display information stored by the information unit 1706. For example, the first interface unit 1712 can provide computer readable code configured to retrieve the information from the information unit 1706. As an illustration, the computer readable code can be configured to display environmental management zone maps, risk profiles, management plans, predicted conditions, comparisons thereof, and/or the like.

In one aspect, the user interface can be configured to allow users to generate management plans for an environmental management zones. For example, users can determine times, amounts, locations, and/or the like to perform management practices, such as adding nutrients, harvesting, irrigating, tilling, aerating, applying pesticides, and/or the like. The management plans can be specific to a plurality of sub-regions of an environmental management zone. The management plans can indicate which management practices to be performed on which days. The management plans can be updated by users and/or in response to threshold conditions being met.

In one aspect, the user interfaces can be configured to allow users to control remote devices, such as a cultivation device 1714. A cultivation device 1714 can be a device configured to apply and/or schedule applications of procedure (e.g., tilling, weeding, aeration) and/or applications of nutrient (e.g., nitrogen, fertilizer, phosphorus, potassium, lime, water). For example, the cultivation device 1714 can be configured to release an amount of a nutrient (e.g., nitrogen, fertilizer, phosphorus, potassium, lime, water) at a specified time and location within the environmental management zone. In one aspect, the cultivation device 1714 can be reconfigured to alter the amount of nutrients applied, timing of nutrients applied, form of nutrient application, and/or the like. For example, the cultivation device 1714 can receive updated application instructions from the management device 1702. The instructions can be updated based on one or more predictions of the one or more models.

In one aspect, the management device 1702 can comprise an update unit 1716 configured to receive updated information. For example, the update unit 1716 can periodically poll information sources, such as the weather device 1708, and/or receive updates (e.g., alerts, notifications) at scheduled and/or unscheduled times. The update unit 1716 can be configured to provide the updated information to the information unit 1706. For example, the update unit 1716 can be configured to determine changes in the information and provide the change and/or the entire updated data. As an illustration, the update unit 1716 can be configured to receive a notification of a weather event, such as a storm, flood, tornado, drought, heat wave, cold snap, and/or the like. The update unit 1716 can provide the updated information to the analysis unit 1710. In response, the analysis unit 1710 can process the updated information and can update other information such as one or more predictions of a condition of the environmental management zone, management plans, management suggestions, risk profiles, and/or the like.

In one aspect, the system 1700 can comprise one or more user devices 1718. The user devices 1718 can be configured to provide content, services, information, applications, and/or the like to one or more users. For example, a user device 1718 can comprise a computer, a smart device (e.g., smart phone, smart watch, smart glasses, smart apparel, smart accessory), a laptop, a tablet, a display device (e.g., television, monitor), digital streaming device, proxy, gateway, transportation device (e.g., on board computer, navigation system, vehicle media center), sensor node, and/or the like.

In one aspect, a user device 1718 can comprise a second interface unit 1720 configured to provide an interface to a user to interact with the user device 1718 and/or remote devices, such as the management device 1702. The second interface unit 1720 can be any interface for presenting and/or receiving information to/from the user, such as user feedback. An example interface can comprise a content viewer, such as a web browser (e.g., Internet Explorer®, Mozilla Firefox®, Google Chrome®, Safari®, or the like), media player, application (e.g., web application, smart device application), and/or the like. Other software, hardware, and/or interfaces can be used to provide communication between the user and one or more of the user device 1718 and the management device 1702. The second interface unit 1720 can be configured to receive the computer readable code from the first interface unit 1712 and render the user interface described above to a user.

FIG. 18 is a flowchart illustrating an example method 1800 for land management. At step 1802, first information associated with an environmental management zone can be received. An environmental management zone can comprise one or more plots of land, regions of land, properties, fields, crop growth locations, and/or the like. The first information can be received by a computing device. The first information can relate to (e.g., comprise, describe, specify, identify, indicate) one or more of a land characteristic (e.g., soil type, topology, drainage) and a management practice (e.g., application information). The first information can comprise a soil type of the environmental management zone. The first information associated with the environmental management zone can comprise application information related to at least one of nitrogen, phosphorus, potassium, lime, water, and/or the like. The application information can comprise an amount applied, a form of application, and/or a timing of application (e.g., day and time, pre-planting time, sidedress) of at least one of nitrogen, phosphorus, potassium, lime, and water. For example, alternative forms of nitrogen application can comprise application of alternative forms of a nutrient (e.g., a different material and/or chemical formulation comprising the nutrient) and/or use of different forms of application (e.g., surface application, injection, and/or the like).

At step 1804, historical weather data relating to (e.g., associated with, describing conditions within) the environmental management zone can be received. The historical weather data can be received by the computing device. For example, the historical weather data can comprise weather data related to prior time periods, such as prior months, growing seasons, and/or the like.

At step 1806, real-time weather data relating to (e.g., associated with, describing conditions within) the environmental management zone can be received. The real-time weather data can be received by the computing device. Real-time weather data can comprise substantially current weather data, such as weather data relating to a time window (e.g., nominal time window). Example time windows for real-time weather data can comprise 1 second, 10 seconds, 5 minutes, 30 minutes, 1 day, or any other appropriate time window for a desired level of accuracy. Real-time weather data can comprise weather data as the weather data is received from weather sensors and provided to the computing device.

At step 1808, a growth model can be executed (e.g., processed on a computer processor) to predict a nitrogen range (e.g., or other nutrient range) for the environmental management zone. The growth model can be executed to predict the nitrogen range based on one or more of the first information, the historical weather data, the real-time weather data, and/or the like. For example, the nitrogen range can comprise probabilities (e.g., a series of probabilities) for one or more of a current time period and a future time period in the growing season. The probabilities can comprise probabilities that a nutrient (e.g., nitrogen) will be below a threshold (e.g., yield limiting level). The probabilities can be specific and/or correspond to a plurality of different portions of the environmental management zone. In an aspect, the probabilities for specific portions of the environmental management zone can be time dependent, vary over time, and/or the like.

In an aspect, the nitrogen range can comprise a range of values that may be interpreted relative to the Nitrogen content in the soil at that location. The range of values can describe boundaries for the Nitrogen concentration estimated to be present in a part of the soil (e.g., located in the environmental management zone). The range of values can comprise probabilities of the likelihood of different concentration levels. The range of values can comprise other values, such as categorical values (e.g., "danger" and "safe"), that may indicate whether the Nitrogen level (e.g., in the all or a part of the environmental management zone) is estimated to be sufficient for the users' objectives or insufficient for the users' objectives.

In an aspect, executing the growth model to predict the nitrogen range for the environmental management zone can comprise forecasting future weather conditions based on at least one of the real-time weather data and the historical weather data.

In one aspect, the growth model can comprise a plant growth model. For example, the growth model can comprise the Crop Environment Resource Synthesis (CERES) maize crop growth and development model. In some embodiments, the growth model can comprise the Decision Support System for Agrotechnology Transfer (DSSAT) model. For example, the DSSAT model may be used when using the present methods and systems with a crop, such as wheat. In one aspect, the growth model can predict the nitrogen range for the environmental management zone based on second information. The second information can comprise one or more of seed planting date, seed planting density, and seed variety attributes. For example, the second information can relate to maize seed. In one aspect, the growth model can further calculate the difference between the optimum point of a nitrogen response curve (e.g., or other nutrient response curve) and one or more of an actual (e.g., measured) current soil rate of nitrogen (e.g., or other nutrient) and a predicted current soil rate of nitrogen (e.g., or other nutrient).

In one aspect, the growth model can be used to calculate an optimum point of a nitrogen response curve (e.g., or other nutrient response curve) based on the probabilities. In one aspect, the optimum point of the nitrogen response curve can be determined based upon the maximum yield per nitrogen. As another example, the optimum point of the nitrogen response curve can be determined based upon the maximum yield per nitrogen (e.g., or other nutrient) adjusted for the economic cost of one or more sources of nitrogen (e.g., or nutrient). As a further example, the optimum point of the nitrogen response curve can be determined based upon the maximum yield per nitrogen (e.g., or other nutrient) adjusted to minimize runoff of excess nitrogen from the environmental management zone.

In an aspect, the growth model may be optimized for use with certain crops. For example, when the growth model is optimized for corn, a soil depth profile of about 2 to 3 feet may be used. For a crop such as wheat, a soil depth profile of about 1 foot may be used in the growth model. For corn, a grain nitrogen removal rate of 0.8 pounds of nitrogen per bushel may be used in the model, while for wheat a higher rate of about 1.5 pounds of nitrogen per bushel can be used in the growth model. As a further example, a critical growth stage for corn, from a nitrogen perspective, can be from V6 to tillering. For wheat, the critical growth stage, from a nitrogen perspective, can be from Feekes 10 to 11. A comparative relative maturity rate (CRM) rate can be used for corn in the growth model. The growth model can use a lodging score when optimized for wheat. A growth model used for wheat can be adjusted to take into account that an over application of nitrogen on wheat can increase the plants susceptibility to lodging with potentially large negative yield effects.

At step 1810, the optimum point of nitrogen (e.g., or other nutrient) can be stored. For example, the optimum point can be stored as an electronic data file and used as an input parameter for application of nitrogen (e.g., or other nutrient). For example, the optimum point can be used to control the application of a nitrogen source (e.g., or other nutrient source). For example, the optimum point can be used by an application machine to apply nitrogen to portions of the environmental management zone. Amounts and places to apply the nitrogen within the environmental management zone can be determined based on the optimum point.

FIG. 19 is a flowchart illustrating an example method 1900 for land management. At step 1902, first information associated with an environmental management zone can be received. The first information can be received by a computing device. The first information can relate to (e.g., comprise, describe, specify, identify, indicate) one or more of a land characteristic (e.g., soil type, topology, drainage) and a first management plan. The first information can comprise a soil type of the environmental management zone. The first information can further comprise one or more of seed planting date, seed planting density, seed variety attributes, and/or the like. For example, the first information can relate to maize seed.

At step 1904, historical weather data relating to (e.g., associated with, describing conditions within) the environmental management zone can be received. For example, the historical weather data can be received by the computing device. For example, the historical weather data can comprise weather data related to prior time periods, such as prior months, growing seasons, and/or the like.

At step 1906, real-time weather data relating to (e.g., associated with, describing conditions within) the environmental management zone can be received. For example, the real-time weather data can be received by the computing device. Real-time weather data can comprise substantially current weather data, such as weather data relating to a time window (e.g., nominal time window). Example time windows for real-time weather data can comprise 1 second, 10 seconds, 5 minutes, 30 minutes, 1 day, or any other appropriate time window for a desired level of accuracy. Real-time weather data can comprise weather data as it is received from weather sensors and provided to the computing device.

At step 1908, a first future soil nitrogen availability (e.g., or first future soil nutrient availability) for the environmental management zone can be generated. For example, the first future soil nitrogen availability for the environmental management zone can be generated based on one or more of the first information, the historical weather data, the real-time weather data, and the like. For example, generating the first future soil nitrogen availability for the environmental management zone can comprise forecasting future weather conditions, soil conditions, nutrient conditions, and/or the like based on at least one of the real-time weather data and the historical weather data.

At step 1910, a first risk profile of yield-limiting soil nitrogen levels (e.g., or other yield-limiting soil nutrient levels) can be generated based upon at least the first future soil nitrogen availability. For example, the first risk profile can comprise one or more probabilities that nutrient levels (e.g., soil nitrogen levels) will be within a certain risk category (e.g., safe, warning, danger). The first risk profile can comprise probabilities that specific conditions will occur (e.g., nitrogen or other nutrient levels will be low enough to limit plant growth yields) in various portions of the environmental management zone. The first risk profile can comprise different probabilities for different portions of the environmental management zone. In an aspect, the probabilities for specific portions of the environmental management zone can be time dependent and/or vary over time.

At step 1912, second information associated with the environmental management zone can be received. For example, the second information can be received by the computing device. The second information can relate to (e.g., comprise, describe, specify, identify, indicate) one or more of the land characteristic (e.g., or another land characteristic) and a second management plan. For example, a user may provide the second management plan. The second management plan can specify different plans for applying nutrients (e.g., different application times, different amounts of nutrients to apply) than are specified in the first management plan. The present methods and systems can comprise a user interface configured to compare risks associated with the first management plan and second management plan.

At step 1914, second future soil nitrogen availability (e.g., or second future soil nutrient availability) for the environmental management zone can be generated. For example, the second future soil nitrogen availability for the environmental management zone can be generated based on one or more of the second information, the historical weather data, the real-time weather data, and/or the like.

At step 1916, a second risk profile of yield-limiting soil nitrogen levels (e.g., or other yield-limiting soil nutrient levels) can be generated based upon at least the second future soil nitrogen availability. For example, the second risk profile can comprise one or more probabilities that nutrient levels (e.g., soil nitrogen levels) will be within a certain risk category (e.g., safe, warning, danger). The second risk profile can comprise probabilities that specific conditions will occur (e.g., nitrogen or other nutrient levels will be low enough to limit plant growth yields) in various portions of the environmental management zone. The second risk profile can comprise different probabilities for different portions of the environmental management zone. In an aspect, the probabilities for specific portions of the environmental management zone can be time dependent and/or vary over time.

At step 1918, the first risk profile and the second risk profile can be provided for display. For example, the first risk profile and second risk profile can be provided (e.g., transmitted) to a local or remote user device (e.g., laptop, smart phone, tablet, workstation). As a further example, a user can request the first risk profile, second risk profile, and/or the like through a user interface, such as a farm management interface. In an aspect, the user interface can be configured to display the risk profile as a risk profile map. The risk profile map can associate and/or display portions of the land management zone with a variety of colors, symbols, hashing, and/or the like to illustrate the different risks for different portions of the management zone.

At step 1920, the first risk profile and the second risk profile can be displayed concurrently for comparison. For example, the first risk profile and the second risk profile can be displayed on the user interface.

FIG. 20 is a flowchart illustrating an example method 2000 for land management. At step 2002, first information associated with an environmental management zone can be received. For example, the first information can be received by a computing device. The first information can relate to (e.g., comprise, describe, specify, identify, indicate) one or more of a land characteristic and a management practice. The first information can comprise a soil type of the environmental management zone. The first information can comprise one or more of seed planting date, seed planting density, seed variety attributes, and/or the like. For example, the first information can relate to maize seed.

At step 2004, historical weather data relating to (e.g., associated with, describing conditions within) the environmental management zone can be received. For example, the historical weather data can be received by the computing device. The historical weather data can comprise weather data related to prior time periods, such as prior months, growing seasons, and/or the like.

At step 2006, real-time weather data relating to (e.g., associated with, describing conditions within) the environmental management zone can be received. For example, the real-time weather data can be received by the computing device. Real-time weather data can comprise substantially current weather data, such as weather data relating to a time window (e.g., nominal time window). Example time windows for real-time weather data can comprise 1 second, 10 seconds, 5 minutes, 30 minutes, 1 day, or any other appropriate time window for a desired level of accuracy. Real-time weather data can comprise weather data as it is received from weather sensors and provided to the computing device.

At step 2008, a nitrogen outcome probability (e.g., or other nutrient outcome probability) for the environmental management zone can be generated. For example, the nitrogen outcome probability for the environmental management zone can be generated based on one or more of the first information, the historical weather data, the real-time weather data for a particular time period, and the like.

A nitrogen (e.g., or other nutrient) outcome probability can be generated using the Crop Environment Resource Synthesis (CERES) maize crop growth and development model. In one aspect, the nitrogen outcome probability can be generated based on a growth model configured to calculate the difference between the optimum point of the nitrogen (e.g., or other nutrient) response curve and one or more of an actual (e.g., measured) current soil rate of nitrogen (e.g., or other nutrient) and a predicted current soil rate of nitrogen (e.g., or other nutrient). In another aspect, generating the nitrogen outcome probability for the environmental management zone can comprise forecasting future weather conditions based on at least one of the real-time weather data and the historical weather data.

The nitrogen (e.g., or other nutrient) outcome probability can comprise a nitrogen (e.g., or other nutrient) response curve. For example, generating the nitrogen (e.g., or other nutrient) outcome probability can comprise calculating an optimum point of a nitrogen response curve (e.g., or other nutrient response curve). The optimum point of the nitrogen response curve can be determined (e.g., calculated) based upon the maximum yield per nitrogen (e.g., or maximum yield per nutrient). The optimum point of the nitrogen (e.g., or other nutrient) response curve can be determined based upon the maximum yield per nitrogen (e.g., or maximum yield per nutrient) adjusted for the economic cost of one or more sources of nitrogen (e.g., or other nutrient). The optimum point of the nitrogen response curve can be determined based upon the maximum yield per nitrogen (e.g., or maximum yield per nutrient) adjusted to minimize runoff of excess nitrogen (e.g., or other nutrient) from the environmental management zone.

At step 2010, second information associated with an environmental management zone can be received. For example, the second information can be received by the computing device. The second information can comprise a change to the received first information. The second information can comprise a change to the land characteristic, the management practice, and/or the like. The second information can comprise an updated soil type of the environmental management zone. The second information can comprise an update to one or more of the seed planting date, the seed planting density, the seed variety attributes, and/or the like.

At step 2012, the nitrogen outcome probability (e.g., or other nutrient outcome probability) can be updated based on the received second information. For example, one or more of steps 2002, 2004, 2006, and 2008 can be repeated with the second information. For example, the growth model can be executed based on the second information (e.g., or the first information with the addition of the second information), historical weather data, the real-time weather data (e.g., real-time weather data updated after the second information is received), and/or the like to determine (e.g., calculate) an update to the nitrogen outcome probability.

In an aspect, the nitrogen outcome probabilities can describe the chance to have sufficient nitrogen at key growing times given a management plan. The next step can comprise updating, revising, and/or the like the management plan so that the new management plan has a better chance of achieving the grower's objectives (e.g., maximizing the likelihood of sufficient nitrogen at critical growth stages given limited funds, limited time to put down applications, access to only a specific N product, etc.)

It should be noted that methods 1800, 1900, and 2000 are not limited to the use of a growth model as described above to determine or generate characteristics or probability values. Additionally, the growth models described with methods 1800, 1900, and 2000 are not limited to determining only the types of values and probabilities described above. For example, other characteristics and probabilities related to an environmental management zone can be determined by the growth model and/or other models. As an illustration, an amount or level of nitrogen, phosphorus, potassium, organic matter, and/or the like for at least a portion of the environmental management zone can be determined and/or predicted based on the growth model and/or other models. As a further illustration, a pH level, water holding capacity (e.g., wilting point, saturation point), and/or the like for at least a portion of an environmental management zone can be determined and/or predicted by the growth model and/or other models.

In an exemplary aspect, the methods and systems can be implemented on a computer 2101 as illustrated in FIG. 21 and described below. By way of example, management device 1702, cultivation device 1714, weather device 1708, and/or user device 1718 of FIG. 17 can be computers as illustrated in FIG. 21. Similarly, the methods and systems disclosed can utilize one or more computers to perform one or more functions in one or more locations. FIG. 21 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2101. The components of the computer 2101 can comprise, but are not limited to, one or more processors or processing units 2103, a system memory 2112, and a system bus 2113 that couples various system components including the processor 2103 to the system memory 2112. In the case of multiple processing units 2103, the system can utilize parallel computing.

The system bus 2113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2113, and all buses specified in this description can also be implemented over a wired or wireless network connection and each of the subsystems, including the processor 2103, a mass storage device 2104, an operating system 2105, land management software 2106, land management data 2107, a network adapter 2108, system memory 2112, an Input/Output Interface 2110, a display adapter 2109, a display device 2111, and a human machine interface 2102, can be contained within one or more remote computing devices 2114a,b,c at physically separate locations, connected through buses of this form, in effect implementing a fully distributed system.

The computer 2101 typically comprises a variety of computer readable media. Exemplary readable media can be any available media that is accessible by the computer 2101 and comprises, for example and not meant to be limiting, both volatile and non-volatile media, removable and non-removable media. The system memory 2112 comprises computer readable media in the form of volatile memory, such as random access memory (RAM), and/or non-volatile memory, such as read only memory (ROM). The system memory 2112 typically contains data such as land management data 2107 and/or program modules such as operating system 2105 and land management software 2106 that are immediately accessible to and/or are presently operated on by the processing unit 2103.

In another aspect, the computer 2101 can also comprise other removable/non-removable, volatile/non-volatile computer storage media. By way of example, FIG. 21 illustrates a mass storage device 2104 which can provide non-volatile storage of computer code, computer readable instructions, data structures, program modules, and other data for the computer 2101. For example and not meant to be limiting, a mass storage device 2104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2104, including by way of example, an operating system 2105 and land management software 2106. Each of the operating system 2105 and land management software 2106 (or some combination thereof) can comprise elements of the programming and the land management software 2106. Land management data 2107 can also be stored on the mass storage device 2104. Land management data 2107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2103 via a human machine interface 2102 that is coupled to the system bus 2113, but can be connected by other interface and bus structures, such as a parallel port, game port, an IEEE 1394 Port (also known as a Firewire port), a serial port, or a universal serial bus (USB).

In yet another aspect, a display device 2111 can also be connected to the system bus 2113 via an interface, such as a display adapter 2109. It is contemplated that the computer 2101 can have more than one display adapter 2109 and the computer 2101 can have more than one display device 2111. For example, a display device can be a monitor, an LCD (Liquid Crystal Display), or a projector. In addition to the display device 2111, other output peripheral devices can comprise components such as speakers (not shown) and a printer (not shown) which can be connected to the computer 2101 via Input/Output Interface 2110. Any step and/or result of the methods can be output in any form to an output device. Such output can be any form of visual representation, including, but not limited to, textual, graphical, animation, audio, tactile, and the like. The display 2111 and computer 2101 can be part of one device, or separate devices.

The computer 2101 can operate in a networked environment using logical connections to one or more remote computing devices 2114*a,b,c*. By way of example, a remote computing device can be a personal computer, portable computer, smartphone, a server, a router, a network computer, a peer device or other common network node, and so on. Logical connections between the computer 2101 and a remote computing device 2114*a,b,c* can be made via a network 2115, such as a local area network (LAN) and/or a general wide area network (WAN). Such network connections can be through a network adapter 2108. A network adapter 2108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2105 are illustrated herein as discrete blocks, although it is recognized that such programs and components reside at various times in different storage components of the computing device 2101, and are executed by the data processor(s) of the computer. An implementation of land management software 2106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising: receiving, by a computing device, first information associated with an environmental management zone, wherein the first information relates to one or more of a land characteristic and a management practice, and wherein the first information comprises a soil type of the environmental management zone; receiving, by the computing device, historical weather data relating to the environmental management zone; receiving, by the computing device, real-time weather data relating to the environmental management zone; and executing a growth model to predict a nitrogen range for the environmental management zone based on one or more of the first information, the historical weather data, and the real-time weather data, wherein the nitrogen range comprises probabilities of nitrogen levels for one or more of a current time period and a future time period in a growing season and the growth model is used to calculate an optimum point of a nitrogen response curve, and applying nitrogen to the environmental management zone based on the probabilities of nitrogen levels and the optimum point of a nitrogen response curve, in each case, as determined by the growth model.

2. The method of claim 1, wherein the optimum point of the nitrogen response curve is determined based upon a maximum yield per nitrogen.

3. The method of claim 1, wherein the optimum point of the nitrogen response curve is determined based upon a maximum yield per nitrogen adjusted for an economic cost of one or more sources of nitrogen.

4. The method of claim 1, wherein the optimum point of the nitrogen response curve is determined based upon a maximum yield per nitrogen adjusted to minimize runoff of excess nitrogen from the environmental management zone.

5. The method of claim 1, wherein the growth model further calculates a difference between the optimum point of the nitrogen response curve and one or more of an actual current soil rate of nitrogen and a predicted current soil rate of nitrogen.

6. The method of claim 1, further comprising storing the optimum point in an electronic data file and using the electronic data file to automate application of a nitrogen source.

7. A method comprising: receiving, by a computing device, first information associated with an environmental management zone, wherein the first information relates to one or more of a land characteristic and a management practice, and wherein the first information comprises a soil type of the environmental management zone; receiving, by the computing device, historical weather data relating to the environmental management zone; receiving, by the computing device, real-time weather data relating to the environmental management zone; generating a probability of nitrogen levels for the environmental management zone based on one or more of the first information, the historical weather data, and the real-time weather data for a particular time period, wherein the probability of nitrogen levels comprises a nitrogen response curve and an optimum point of the nitrogen response curve; receiving, by the computing device, second information associated with the environmental management zone, wherein the second information comprises a change to the first information; and updating the nitrogen outcome probability of the chance to have sufficient nitrogen based on the second information, and applying nitrogen to the environmental management zone based on the probabilities of nitrogen levels and the optimum point of the nitrogen response curve.

8. The method of claim 7, wherein the optimum point of the nitrogen response curve is determined based upon a maximum yield per nitrogen.

9. The method of claim 7, wherein the optimum point of the nitrogen response curve is determined based upon a maximum yield per nitrogen adjusted for an economic cost of one or more sources of nitrogen.

10. The method of claim 7, wherein the optimum point of the nitrogen response curve is determined based upon a maximum yield per nitrogen adjusted to minimize runoff of excess nitrogen from the environmental management zone.

11. The method of claim 7, wherein the nitrogen outcome probability is generated based on a growth model configured to calculate a difference between the optimum point of the nitrogen response curve and one or more of an actual current soil rate of nitrogen and a predicted current soil rate of nitrogen.

12. The method of claim 7, wherein generating the nitrogen outcome probability for the environmental management zone comprises forecasting future weather conditions based on at least one of the real-time weather data and the historical weather data.

* * * * *